(12) United States Patent
Rafii et al.

(10) Patent No.: US 6,512,838 B1
(45) Date of Patent: Jan. 28, 2003

(54) METHODS FOR ENHANCING PERFORMANCE AND DATA ACQUIRED FROM THREE-DIMENSIONAL IMAGE SYSTEMS

(75) Inventors: Abbas Rafii, Los Altos, CA (US); Cyrus Bamji, Ocaco Camino (IN); Cheng-Feng Sze, Cupertino, CA (US); Iihami Torunoglu, San Jose, CA (US)

(73) Assignee: Canesta, Inc., San Jose, CA (US)

( * ) Notice: Subject to any disclaimer, the term of this patent is extended or adjusted under 35 U.S.C. 154(b) by 32 days.

(21) Appl. No.: 09/684,368

(22) Filed: Oct. 5, 2000

Related U.S. Application Data

(63) Continuation-in-part of application No. 09/401,059, filed on Sep. 22, 1999, now Pat. No. 6,323,942, and a continuation-in-part of application No. 09/502,499, filed on Feb. 11, 2000.
(60) Provisional application No. 60/157,659, filed on Oct. 5, 1999.

(51) Int. Cl.[7] .............................. G06K 9/00; G06K 9/32
(52) U.S. Cl. ....................................... 382/106; 382/293
(58) Field of Search ................................. 356/5.01, 622, 356/623; 382/106, 276, 166, 293; 345/168, 173

(56) References Cited

U.S. PATENT DOCUMENTS

| | | | |
|---|---|---|---|
| 3,830,567 A | | 8/1974 | Riegl |
| 4,277,167 A | | 7/1981 | Eppel |
| 4,708,473 A | | 11/1987 | Metzdorff et al. |
| 4,764,982 A | | 8/1988 | Pfund |
| 4,954,972 A | * | 9/1990 | Sullivan ............... 356/328 |
| 5,309,212 A | * | 5/1994 | Clark ................... 356/141.1 |
| 5,319,387 A | * | 6/1994 | Yoshikawa ............ 345/157 |
| 5,359,511 A | * | 10/1994 | Schroeder et al. ...... 433/75 |
| 5,446,529 A | | 8/1995 | Stettner et al. |
| 5,682,229 A | | 10/1997 | Wangler |
| 5,739,901 A | | 4/1998 | Fujioka et al. |
| 5,767,842 A | * | 6/1998 | Korth ................... 345/168 |
| 5,798,519 A | | 8/1998 | Vock et al. |
| 5,835,204 A | | 11/1998 | Urbach |
| 5,892,575 A | | 4/1999 | Marino |
| 5,936,615 A | | 8/1999 | Waters |
| 5,953,110 A | | 9/1999 | Burns |
| 6,006,021 A | * | 12/1999 | Tognazzini ............ 342/179 |
| 6,043,805 A | * | 3/2000 | Hsieh .................. 345/158 |
| 6,064,354 A | * | 5/2000 | DeLuca ................ 345/419 |
| 6,115,128 A | * | 9/2000 | Vann ................... 250/559.38 |
| 6,137,566 A | | 10/2000 | Leonard et al. |
| 6,241,675 B1 | * | 6/2001 | Smith et al. .......... 128/916 |
| 6,281,878 B1 | * | 8/2001 | Montellese ........... 345/156 |
| 6,310,682 B1 | | 10/2001 | Gavish et al. |

\* cited by examiner

*Primary Examiner*—Joseph Mancuso
*Assistant Examiner*—Martin Miller
(74) *Attorney, Agent, or Firm*—Dorsey & Whitney LLP

(57) ABSTRACT

A three-dimension distance time-of-flight system is disclosed in which distance values are acquired by a plurality of sensors independently from each other. For use with this and similar systems, Z-distance accuracy and resolution are enhanced using various techniques including over-sampling acquired sensor data and forming running averages, or forming moving averages. Acquired data may be rejected if it fails to meet criteria associated with distance, luminosity, velocity, or estimated shape information reported by neighboring sensors. A sub-target having at least one pre-calibrated reflectance zone is used to improve system measurement accuracy. Elliptical error is corrected for using a disclosed method, and reversible mapping of Z-values into RGB is provided.

2 Claims, 21 Drawing Sheets

| d | d | d | d | 8 | 8 | 2 | 2 | 2 | d | d | 1 | 1 | 1 | 1 | 3 | 3 | 3 | 3 | 7 | 7 |
|---|---|---|---|---|---|---|---|---|---|---|---|---|---|---|---|---|---|---|---|---|
| d | d | d | 8 | 7 | 7 | 2 | 2 | 2 | d | 1 | 1 | 1 | 1 | 1 | 2 | 2 | 2 | 2 | 5 | 5 |
| d | d | 7 | 7 | 7 | 8 | 1 | 1 | 1 | d | 1 | 1 | 1 | 1 | 1 | 2 | 2 | 2 | d | 5 | |
| d | d | 7 | 1 | 8 | d | 1 | 2 | d | 1 | 3 | 1 | 1 | 1 | 1 | 3 | 5 | | | | |
| d | 8 | 7 | 7 | 8 | d | 1 | 1 | d | 1 | 1 | 1 | 1 | 1 | 4 | 1 | 2 | 2 | d | | |
| 7 | 7 | 7 | 7 | 7 | d | 1 | 1 | 1 | d | 1 | 1 | 1 | 1 | 1 | 1 | 1 | 1 | 1 | d | d |
| d | d | d | d | d | d | 1 | 1 | 1 | d | d | d | d | d | d | d | d | d | d | d | d |

FIG. 7B

| d | d | d | d | 8 | 2 | 2 | 2 | 2 | d | d | 1 | 1 | 1 | 1 | 3 | 3 | 3 | 3 | 7 | 7 |
|---|---|---|---|---|---|---|---|---|---|---|---|---|---|---|---|---|---|---|---|---|
| d | d | d | 8 | 7 | 2 | 2 | 2 | 2 | d | 1 | 1 | 1 | 1 | 1 | 2 | 2 | 2 | 2 | 5 | 5 |
| d | d | 7 | 7 | 7 | 8 | 1 | 1 | 1 | d | 1 | 1 | 1 | 1 | 1 | 2 | 2 | 2 | d | 5 | |
| d | d | 7 | 1 | 8 | d | 1 | 2 | d | 1 | 3 | 1 | 1 | 1 | 1 | 3 | 5 | | | | |
| d | 8 | 7 | 7 | 8 | d | 1 | 1 | d | 1 | 1 | 1 | 1 | 1 | 4 | 1 | 2 | 2 | d | | |
| 7 | 7 | 7 | 7 | 7 | d | 1 | 1 | 1 | d | 1 | 1 | 1 | 1 | 1 | 1 | 1 | 1 | 1 | d | d |

FIG. 7C

| d | d | d | d | 8 | 2 | 2 | 2 | 2 | d | d | 1 | 1 | 1 | 1 | 3 | 3 | 3 | 3 | 7 | 7 |
|---|---|---|---|---|---|---|---|---|---|---|---|---|---|---|---|---|---|---|---|---|
| d | d | d | 8 | 7 | 2 | 2 | 2 | 2 | d | 1 | 1 | 1 | 1 | 1 | 2 | 2 | 2 | 2 | 5 | 5 |
| d | d | 7 | 7 | 7 | 8 | 1 | 1 | 1 | d | 1 | 1 | 1 | 1 | 1 | 2 | 2 | 2 | d | 5 | |
| d | d | 7 | 1 | 8 | d | 1 | 2 | d | 1 | 3 | 1 | 1 | 1 | 1 | 3 | 5 | | | | |
| d | 8 | 7 | 7 | 8 | d | 1 | 1 | d | 1 | 1 | 1 | 1 | 1 | 4 | 1 | 2 | 2 | d | | |
| 7 | 7 | 7 | 7 | 7 | d | 1 | 1 | 1 | d | 1 | 1 | 1 | 1 | 1 | 1 | 1 | 1 | 1 | d | d |
| d | d | d | d | d | d | 1 | 1 | 1 | d | d | d | d | d | d | d | d | d | d | d | d |

↑ FINGER TIPS

HIGH POINT

CONTACT

FIG. 7J

| d | d | d | d | 8 | 8 | 1 | 1 | 1 | d | d | 1 | 1 | 1 | 1 | 3 | 3 | 3 | 3 | 7 | 7 |
|---|---|---|---|---|---|---|---|---|---|---|---|---|---|---|---|---|---|---|---|---|
| d | d | d | 8 | 7 | d | 1 | 1 | 1 | d | 1 | 1 | 1 | 1 | 1 | 2 | 2 | 2 | 2 | 5 | 5 |
| d | d | 7 | 7 | 7 | d | 1 | 1 | 1 | d | 1 | 1 | 1 | 1 | 1 | 2 | 2 | 2 | d | 5 | |
| d | d | 7 | 1 | 8 | d | 2 | 2 | 2 | d | 1 | 3 | 1 | 1 | 1 | 1 | 4 | 1 | 3 | | |
| d | 8 | 7 | 7 | 8 | d | 2 | 2 | 2 | d | 1 | 1 | 1 | 1 | 1 | 1 | | 1 | 2 | 2 | d |
| 7 | 7 | 7 | 7 | 7 | d | d | d | d | d | 1 | 1 | 1 | 1 | 1 | 1 | 1 | 1 | 1 | d | d |
| d | d | d | d | d | d | d | 2 | d | d | d | d | d | d | d | d | d | d | d | d | d |

FIG. 7K

| d | d | d | d | 8 | d | 2 | 2 | 2 | d | 1 | 1 | 1 | 1 | 3 | 3 | 3 | 3 | 7 | 7 |
|---|---|---|---|---|---|---|---|---|---|---|---|---|---|---|---|---|---|---|---|
| d | d | d | 8 | 7 | d | 3 | 3 | 3 | d | 1 | 1 | 1 | 1 | 1 | 2 | 2 | 2 | 2 | 5 | 5 |
| d | d | 7 | 7 | 7 | d | 3 | 3 | 3 | d | 1 | 1 | 1 | 1 | 1 | 2 | 2 | 2 | d | 5 | |
| d | d | 7 | 1 | 8 | d | d | 2 | d | 1 | 3 | 1 | 1 | 1 | 1 | 4 | 1 | 3 | | | |
| d | 8 | 7 | 7 | 8 | d | d | d | d | d | 1 | 1 | 1 | 1 | 1 | 1 | 1 | 2 | 2 | d | |
| 7 | 7 | 7 | 7 | 7 | d | d | d | d | d | 1 | 1 | 1 | 1 | 1 | 1 | 1 | 1 | 1 | d | d |
| d | d | d | d | d | d | d | d | 1 | d | d | d | d | d | d | d | d | d | d | d | d |

FIG. 7L

| d | d | d | d | 8 | d | 3 | 2 | 2 | d | d | 1 | 1 | 1 | 1 | 3 | 3 | 3 | 3 | 7 | 7 |
|---|---|---|---|---|---|---|---|---|---|---|---|---|---|---|---|---|---|---|---|---|
| d | d | d | 8 | 7 | d | 3 | 2 | 3 | d | 1 | 1 | 1 | 1 | 1 | 2 | 2 | 2 | 2 | 5 | 5 |
| d | d | 7 | 7 | 7 | d | 3 | 3 | 3 | d | 1 | 1 | 1 | 1 | 1 | 2 | 2 | 2 | d | 5 | |
| d | d | 7 | 1 | 8 | d | 4 | 4 | 4 | d | 1 | 3 | 1 | 1 | 1 | 4 | 1 | 3 | | | |
| d | 8 | 7 | 7 | 8 | d | d | d | d | d | 1 | 1 | 1 | 1 | 1 | 1 | 1 | 2 | 2 | d | |
| 7 | 7 | 7 | 7 | 7 | d | d | d | d | d | 1 | 1 | 1 | 1 | 1 | 1 | 1 | 1 | 1 | d | d |
| d | d | d | d | d | d | d | d | d | d | d | d | d | d | d | d | d | d | d | d | d |

FIG. 7M

| d | d | d | d | 8 | 2 | 2 | 2 | 2 | d | d | 1 | 1 | 1 | 1 | 3 | 3 | 3 | 3 | 7 | 7 |
|---|---|---|---|---|---|---|---|---|---|---|---|---|---|---|---|---|---|---|---|---|
| d | d | d | 8 | 7 | 8 | 2 | 2 | 2 | d | 1 | 1 | 1 | 1 | 1 | 2 | 2 | 2 | 2 | 5 | 5 |
| d | d | 7 | 7 | 7 | d | 3 | 2 | 3 | d | 1 | | 3 | 1 | 1 | 2 | 2 | 2 | d | 5 | |
| d | d | 7 | 1 | 8 | d | 3 | 3 | 3 | d | 1 | | | 1 | 1 | 1 | | 1 | 3 | | |
| d | 8 | 7 | 7 | 8 | d | 3 | 3 | 3 | d | 1 | 1 | 1 | 1 | 1 | 4 | | 1 | 2 | 2 | d |
| 7 | 7 | 7 | 7 | 7 | d | 4 | 4 | 4 | d | 1 | 1 | 1 | 1 | 1 | 1 | 1 | 1 | 1 | d | d |
| d | d | d | d | d | d | d | d | d | d | d | d | d | d | d | d | d | d | d | d | d |

FIG. 7N

| d | d | d | d | 8 | 2 | 2 | 2 | 2 | d | d | 1 | 1 | 1 | 1 | 3 | 3 | 3 | 3 | 7 | 7 |
|---|---|---|---|---|---|---|---|---|---|---|---|---|---|---|---|---|---|---|---|---|
| d | d | d | 8 | 7 | 2 | 2 | 2 | 2 | d | 1 | 1 | 1 | 1 | 1 | 2 | 2 | 2 | 2 | 5 | 5 |
| d | d | 7 | 7 | 7 | 8 | 3 | 2 | 3 | d | 1 | | 3 | 1 | 1 | 2 | 2 | 2 | d | 5 | |
| d | d | 7 | 1 | 8 | d | 3 | 3 | 3 | d | 1 | | | 1 | 1 | 1 | | 1 | 3 | | |
| d | 8 | 7 | 7 | 8 | d | 3 | 3 | 3 | d | 1 | 1 | 1 | 1 | 1 | 4 | | 1 | 2 | 2 | d |
| 7 | 7 | 7 | 7 | 7 | d | 4 | 4 | 4 | d | 1 | 1 | 1 | 1 | 1 | 1 | 1 | 1 | 1 | d | d |
| d | d | d | d | d | d | 4 | 4 | d | d | d | d | d | d | d | d | d | d | d | d | d |

CONTACT (LOW POINT)

FIG. 7O

METHODS FOR ENHANCING PERFORMANCE AND DATA ACQUIRED FROM THREE-DIMENSIONAL IMAGE SYSTEMS

RELATION TO PREVIOUSLY FILED APPLICATION

Priority is claimed from U.S. provisional patent application, serial No. 60/157,659 filed on Oct. 5, 1999 and entitled "Software Algorithms and Applications for Direct 3D Sensing", Abbas Rafii and Cyrus Bamji, applicants. This present application is a continuation-in-part of U.S. patent application Ser. No. 09/401,059 filed on Sep. 22, 1999, now U.S. Pat. No. 6,323,942 entitled "CMOS-COMPATIBLE THREE-DIMENSIONAL IMAGE SENSOR IC", Cyrus Bamji, applicant, and of co-pending U.S. patent application Ser. No. 09/502,499 filed on Feb. 11, 2000, entitled 'METHOD AND APPARATUS FOR ENTERING DATA USING A VIRTUAL INPUT DEVICE", Abbas Rafii, Cyrus Bamji, and Nazim Kareemi, applicants. Each said co-pending application is assigned to assignee herein.

FIELD OF THE INVENTION

The present invention relates generally to software based processing techniques to improve performance and data obtained from range finder type image sensors, including three-dimensional range finder type image sensors, and sensing systems such as described in the above-reference co-pending applications in which a sensor array detects reflected source emissions and can determine x,y,z coordinates of the target reflecting the source emissions.

BACKGROUND OF THE INVENTION

Computer systems that receive and process input data are well known in the art. Typically such systems include a central processing unit (CPU), persistent read only memory (ROM), random access memory (RAM), at least one bus interconnecting the CPU, the memory, at least one input port to which a device is coupled input data and commands, and typically an output port to which a monitor is coupled to display results. Traditional techniques for inputting data have included use of a keyboard, mouse, joystick, remote control device, electronic pen, touch panel or pad or display screen, switches and knobs, and more recently handwriting recognition, and voice recognition.

Computer systems and computer-type systems have recently found their way into a new generation of electronic devices including interactive TV, set-top boxes, electronic cash registers, synthetic music generators, handheld portable devices including so-called personal digital assistants (PDA), and wireless telephones. Conventional input methods and devices are not always appropriate or convenient when used with such systems.

For example, some portable computer systems have shrunk to the point where the entire system can fit in a user's hand or pocket. To combat the difficulty in viewing a tiny display, it is possible to use a commercially available virtual display accessory that clips onto an eyeglass frame worn by the user of the system. The user looks into the accessory, which may be a 1" VGA display, and sees what appears to be a large display measuring perhaps 15" diagonally.

Studies have shown that use of a keyboard and/or mouse-like input device is perhaps the most efficient technique for entering or editing data in a companion computer or computer-like system. Unfortunately it has been more difficult to combat the problems associated with a smaller size input device, as smaller sized input devices can substantially slow the rate with which data can be entered. For example, some PDA systems have a keyboard that measures about 3"×7". Although data and commands may be entered into the PDA via the keyboard, the entry speed is reduced and the discomfort level is increased, relative to having used a full sized keyboard measuring perhaps 6"×12". Other PDA systems simply eliminate the keyboard and provide a touch screen upon which the user writes alphanumeric characters with a stylus. Handwriting recognition software within the PDA then attempts to interpret and recognize alphanumeric characters drawn by the user with a stylus on a touch sensitive screen. Some PDAs can display an image of a keyboard on a touch sensitive screen and permit users to enter data by touching the images of various keys with a stylus. In other systems, the distance between the user and the computer system may preclude a convenient use of wire-coupled input devices, for example the distance between a user and a set-top box in a living room environment precludes use of a wire-coupled mouse to navigate.

Another method of data and command input to electronic devices is recognizing visual images of user actions and gestures that are then interpreted and converted to commands for an accompanying computer system. One such approach was described in U.S. Pat. No. 5,767,842 to Korth (1998) entitled "Method and Device for Optical Input of Commands or Data". Korth proposed having a computer system user type on an imaginary or virtual keyboard, for example a keyboard-sized piece of paper bearing a template or a printed outline of keyboard keys. The template is used to guide the user's fingers in typing on the virtual keyboard keys. A conventional TV (two-dimensional) video camera focused upon the virtual keyboard was stated to somehow permit recognition of what virtual key (e.g., printed outline of a key) was being touched by the user's fingers at what time as the user "typed" upon the virtual keyboard.

But Korth's method is subject to inherent ambiguities arising from his reliance upon relative luminescence data, and indeed upon an adequate source of ambient lighting. While the video signal output by a conventional two-dimensional video camera is in a format that is appropriate for image recognition by a human eye, the signal output is not appropriate for computer recognition of viewed images. For example, in a Korth-type application, to track position of a user's fingers, computer-executable software must determine contour of each finger using changes in luminosity of pixels in the video camera output signal. Such tracking and contour determination is a difficult task to accomplish when the background color or lighting cannot be accurately controlled, and indeed may resemble the user's fingers. Further, each frame of video acquired by Korth, typically at least 100 pixels×100 pixels, only has a grey scale or color scale code (typically referred to as RGB). Limited as he is to such RGB value data, a microprocessor or signal processor in a Korth system at best might detect the contour of the fingers against the background image, if ambient lighting conditions are optimal.

The attendant problems are substantial as are the potential ambiguities in tracking the user's fingers. Ambiguities are inescapable with Korth's technique because traditional video cameras output two-dimensional image data, and do not provide unambiguous information about actual shape and distance of objects in a video scene. Indeed, from the vantage point of Korth's video camera, it would be very difficult to detect typing motions along the axis of the camera lens. Therefore, multiple cameras having different vantage points would be needed to adequately capture the complex keying motions. Also, as suggested by Korth's FIG. 1, it can be difficult merely to acquire an unobstructed view of each finger on a user's hands, e.g., acquiring an image of the right forefinger is precluded by the image-blocking presence of the right middle finger, and so forth. In short, even with good ambient lighting and a good vantage point for his camera, Korth's method still has many shortcomings, including ambiguity as to what row on a virtual keyboard a user's fingers is touching.

In an attempt to gain depth information, the Korth approach may be replicated using multiple two-dimensional video cameras, each aimed toward the subject of interest from a different viewing angle. Simple as this proposal sounds, it is not practical. The setup of the various cameras is cumbersome and potentially expensive as duplicate cameras are deployed. Each camera must be calibrated accurately relative to the object viewed, and relative to each other. To achieve adequate accuracy the stereo cameras would like have to be placed at the top left and right positions relative to the keyboard. Yet even with this configuration, the cameras would be plagued by fingers obstructing fingers within the view of at least one of the cameras. Further, the computation required to create three-dimensional information from the two-dimensional video image information output by the various cameras contributes to the processing overhead of the computer system used to process the image data. Understandably, using multiple cameras would substantially complicate Korth's signal processing requirements. Finally, it can be rather difficult to achieve the necessary camera-to-object distance resolution required to detect and recognize fine object movements such as a user's fingers while engaged in typing motion.

In short, it may not be realistic to use a Korth approach to examine two-dimensional luminosity-based video images of a user's hands engaged in typing, and accurately determine from the images what finger touched what key (virtual or otherwise) at what time. This shortcoming remains even when the acquired two-dimensional video information processing is augmented with computerized image pattern recognition as suggested by Korth. It is also seen that realistically Korth's technique does not lend itself to portability. For example, the image acquisition system and indeed an ambient light source will essentially be on at all times, and will consume sufficient operating power to preclude meaningful battery operation. Even if Korth could reduce or power down his frame rate of data acquisition to save some power, the Korth system still requires a source of adequate ambient lighting.

Power considerations aside, Korth's two-dimensional imaging system does not lend itself to portability with small companion devices such as cell phones because Korth's video camera (or perhaps cameras) requires a vantage point above the keyboard. This requirement imposes constraints on the practical size of Korth's system, both while the system is operating and while being stored in transit.

There exist other uses for three-dimensional images, if suitable such images can be acquired. For example, it is known in the art to use multiple video camera to create three-dimensional images of an object or scene, a technique that is common in many industrial and research applications. With multiple cameras, distance to a target point is estimated by software by measuring offset of the pixel images of the same point in two simultaneous frames obtained by two cameras such that a higher offset means a greater distance from target to the cameras. But successful data acquisition from multiple cameras requires synchronization among the cameras, e.g., using a synch box. Proper camera calibration is also required, including knowledge of the distance between cameras for input to a distance estimator algorithm. The use of multiple cameras increases system cost, especially where each camera may cost from $100 to $1,000 or more, depending upon the application. Distance measurement accuracy degrades using multiple cameras if the cameras are placed too close together, a configuration that may be demanded by mobile image acquiring systems. Further, the image processing software can encounter difficulty trying to match pixels from the same target in frames from two different cameras. Moving objects and background patterns can be especially troublesome. Understandably, extracting distance information from multiple cameras requires processing and memory overhead, which further contributes to workload of the application. As noted, prior art video cameras disadvantageously generally require sufficient ambient lighting to generate a clear image of the target.

Prior art systems that use other single-modal methods of input, e.g., using only speech recognition or only gesture recognition, frequently encounter performance problems with erroneous recognition of what is being input., especially when used in noisy or other less than ideal environments.

What is needed is an accurate method of determining three-dimensional distances, preferably acquired from a single camera that is operable without dependence upon ambient light. One such camera system was disclosed in applicants' reference applications, although such camera system has uses beyond what is described in applicants' referenced patent application(s). There is a need for use with such camera system, and with three-dimensional distance measurement systems in general, measurement techniques to reduce z-measurement error. Further, such measurement techniques should exhibit improved x-y resolution and brightness values, preferably using a process that does not unduly tax the computational ability or power consumption requirements of the overall system used to acquire the images. Further, such software techniques used with such method and system should correct for geometric error, and enable RGB encoding.

There is also a need for a multi-modal interface such as voice recognition combined with gesture recognition that can reduce recognition errors present in single-modal interfaces, e.g., speech recognition, and can result in inproved overall system performance.

The present invention provides software implementable techniques for improving the performance of such methods and systems, and is applicable to a wide range of three-dimensional image acquisition systems.

SUMMARY OF THE INVENTION

Applicants' referenced applications disclose systems to collect three-dimensional position data. One such system enables a user to input commands and data (collectively, referred to as data) from a passive virtual emulation of a manual input device to a companion computer system, which may be a PDA, a wireless telephone, or indeed any electronic system or appliance adapted to receive digital input signals. The system included a three-dimensional sensor imaging system that was functional even without ambient light to capture in real-time three-dimensional data as to placement of a user's fingers on a substrate bearing or displaying a template that is used to emulate an input device such as a keyboard, keypad, or digitized surface. The substrate preferably is passive and may be a foldable or rollable piece of paper or plastic containing printed images of keyboard keys, or simply indicia lines demarking where rows and columns for keyboard keys would be. The substrate may be defined as lying on a horizontal X-Z plane where the Z-axis define template key rows, and the X-axis defines template key columns, and where the Y-axis denotes vertical height above the substrate. If desired, in lieu of a substrate keyboard, the invention can include a projector that uses light to project a grid or perhaps an image of a keyboard onto the work surface in front of the companion device. The projected pattern would serve as a guide for the user in "typing" on this surface. The projection device preferably would be included in or attachable to the companion device.

The disclosed three-dimensional sensor system determined substantially in real time what fingers of the user's hands "typed" upon what virtual key or virtual key position in what time order. Preferably the three-dimensional sensor system included a signal processing unit comprising a central processor unit (CPU) and associated read only memory (ROM) and random access memory (RAM). Stored in ROM is a software routine executed by the signal processing unit CPU such that three-dimensional positional information is received and converted substantially in real-time into key-scan data or other format data directly compatible as device input to the companion computer system. Preferably the three-dimensional sensor emits light of a specific wavelength, and detects return energy time-of-flight from various surface regions of the object being scanned, e.g., a user's hands. Applicants' referenced applications disclosed various power saving modes of operation, including low 1 to perhaps 10 pulse/second repetition rates during times of non-use, during which times low resolution data could still be acquired. When the system determines that an object entered the imaging field of view, a CPU governing system operation commands entry into a normal operating mode in which a high pulse rate is employed and system functions are operated at full power.

In applicants' earlier disclosed system, three-dimensional data was used to implement various virtual input devices, including virtual keyboards. The user's fingers were imaged in three dimensions as the user "typed" on virtual keys. The disclosed sensor system output data to a companion computer system in a format functionally indistinguishable from data output by a conventional input device such as a keyboard, a mouse, etc. Software preferably executable by the signal processing unit CPU (or by the CPU in the companion computer system) processes the incoming three-dimensional information and recognizes the location of the user's hands and fingers in three-dimensional space relative to the image of a keyboard on the substrate or work surface (if no virtual keyboard is present).

As disclosed in the referenced application, the software routine preferably identified contours of the user's fingers in each frame by examining Z-axis discontinuities. When a finger "typed" a key, or "typed" in a region of a work surface where a key would be if a keyboard (real or virtual) were present, a physical interface between the user's finger and the virtual keyboard or work surface was detected. The software routine examined preferably optically acquired data to locate such an interface boundary in successive frames to compute Y-axis velocity of the finger. (In other embodiments, lower frequency energy such as ultrasound could instead be used.) When such vertical finger motion stopped or, depending upon the routine, when the finger made contact with the substrate, the virtual key being pressed was identified from the (Z, X) coordinates of the finger in question. An appropriate KEYDOWN event command could then be issued, and a similar analysis was performed for all fingers (including thumbs) to precisely determine the order in which different keys are contacted (e.g., are "pressed"). In this fashion, the software issued appropriate KEYUP, KEYDOWN, and scan code data commands to the companion computer system. Virtual "key" commands could also toggle the companion computer system from data input mode to graphics mode. Errors resulting from a drifting of the user's hands while typing, e.g., a displacement on the virtual keyboard were correctable, and hysteresis was provided to reduce error from inadvertent user conduct not intended to result in "pressing" a target key. The measurement error was further reduced utilizing a lower Z-axis frame rate than used for tracking X-values and Y-values. Attempts were made to average Z-axis acquired data over several frames to reduce noise or jitter.

The present invention provides further improvements to the acquisition and processing of data obtained with three-dimensional image systems, including systems as above-described. In general, the methods disclosed in the present invention are applicable to systems in which three-dimensional data is acquired with statistically independent measurements having no real correlation between data-acquiring sensors. The parent patent application with its array of independent pixels was one such system. The present invention improves measurement accuracy of data acquisition in such systems, in that such systems characteristically exhibit system noise having a relatively large random component. Collectively, software and techniques according to the present invention include over-sampling, the use of various averaging techniques including moving averages, averaging over pixels, intra-frame averaging, using brightness values to reduce error, correcting for geometric error including elliptical error. Advantageously, the present invention also permits encoding Z-distance in RGB.

In summary, the techniques disclosed herein enhance the performance of such systems including/direct three-dimensional sensing cameras using mathematical and heuristic techniques to reduce error, increase resolution, and optionally integrate data with the existing RGB data type. The improved data processing techniques may be practiced with a range of systems including virtual data input device systems, other hands-free interaction with computing systems, game machines and other electrical appliances, including use in the fields of security and identification measurement. In the various embodiments of the present invention, three-dimensional data measurements of objects in the field of view of a camera are acquired and processed at video speed substantially in real time. In one embodiment, reflective strips are disposed on objects within the viewed scene to enhance three-dimensional measurement performance.

Other features and advantages of the invention will appear from the following description in which the preferred embodiments have been set forth in detail, in conjunction with the accompanying drawings.

BRIEF DESCRIPTION OF THE DRAWINGS

FIGS. 7A–7O depict cluster matrices generated from optically acquired three-dimensional data for use in identifying user finger location, according to the present invention;

DETAILED DESCRIPTION OF THE PREFERRED EMBODIMENT

Applicants' referenced system will first be described with respect to FIGS. 1A–7O, after which applicants' present invention will be described with respect to FIG. 8–17.

Figure 1A:
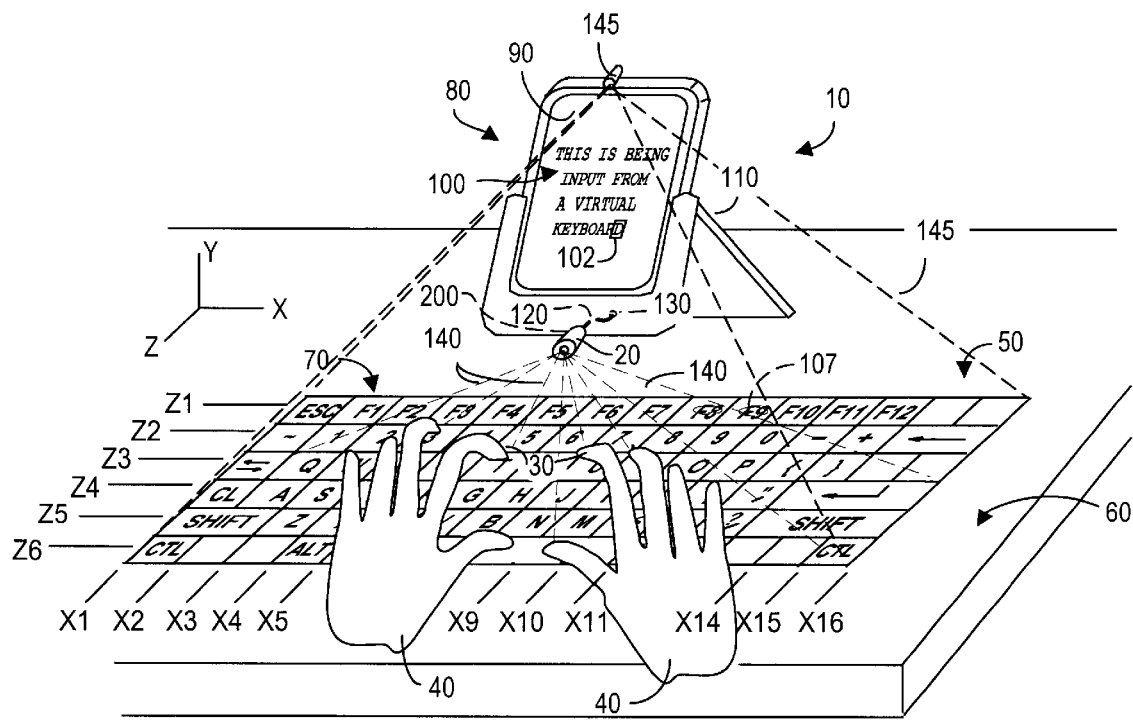
FIG. 1A depicts a three-dimensional sensor system used with a passive substrate keyboard template, with which system the present invention may be practiced.

FIG. 1A depicts a three-dimensional sensor system 10 comprising a three-dimensional sensor 20 focused essentially edge-on towards the fingers 30 of a user's hands 40, as the fingers "type" on a substrate 50, shown here atop a desk or other work surface 60. Substrate 50 preferably bears a printed or projected template 70 comprising lines or indicia representing a data input device, for example a keyboard. As such, template 70 may have printed images of keyboard keys, as shown, but it is understood the keys are electronically passive, and are merely representations of real keys. Substrate 50 is defined as lying in a Z-X plane in which various points along the X-axis relate to left-to-right column locations of keys, various points along the Z-axis relate to front-to-back row positions of keys, and Y-axis positions relate to vertical distances above the Z-X plane. It is understood that (X,Y,Z) locations are a continuum of vector positional points, and that various axis positions are definable in substantially more than few number of points indicated in FIG. 1A.

Figure 1B:
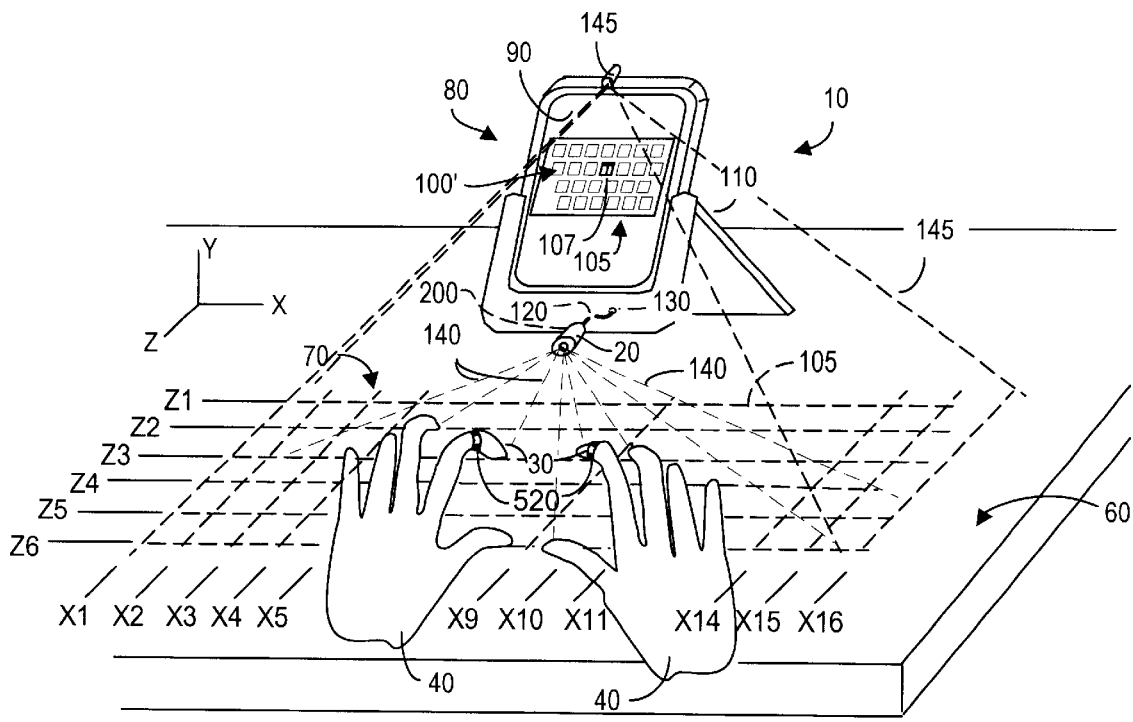
FIG. 1B depicts a three-dimensional sensor system that may be used without a substrate keyboard template, with which system the present invention may be practiced.
Figure 2A:
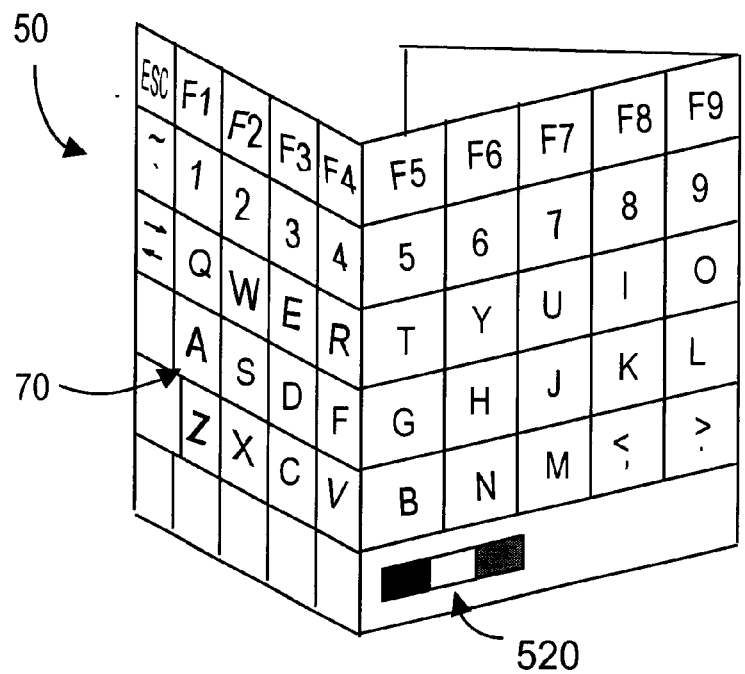
FIG. 2A depicts a passive substrate in a partially folded disposition, with which system the present invention may be practiced.
Figure 2B:
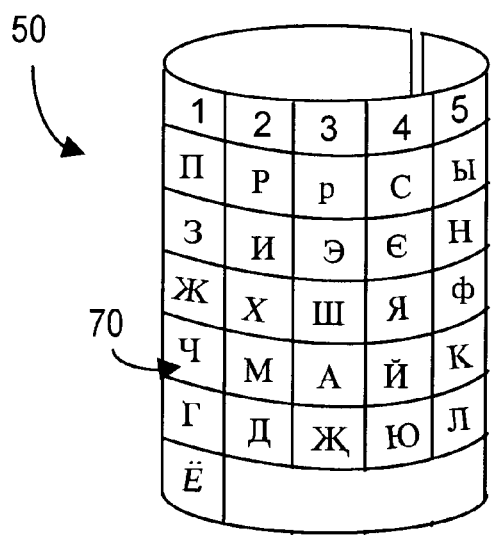
FIG. 2B depicts a passive substrate, bearing a different character set, in a partially rolled-up disposition, according to the present invention.

If desired, template 70 may simply contain row lines and column lines demarking where keys would be present. Substrate 50 with template 70 printed or otherwise appearing thereon is a virtual input device that in the example shown emulates a keyboard. As such substrate 50 and/or template 70 may be referred to herein as a virtual keyboard or virtual device for inputting digital data and/or commands. An advantage of such a virtual input device is that it may be printed on paper or flexible plastic and folded as shown in FIG. 2A, or rolled-up (or folded and rolled-up) as shown in FIG. 2B. It is understood that the arrangement of keys need not be in a rectangular matrix as shown for ease of illustration in several of the figures, but may be laid out in staggered or offset positions as in a real QWERTY keyboard. FIG. 2B also shows the device with an alternate keyset printed as template 70, here Cyrillic alphabet characters. If desired, one keyset could be printed on one side of the template, and a second keyset on the other, e.g., English and Russian characters. Shown in FIG. 2A is an optional reflectivity target 520 having at least one region of known and preferably calibrated reflectance. For ease of illustration target 520 is drawn in the plane of substrate 50. In practice, however, target 520 will have a somewhat elevated surface to ensure being observed by system 10. A similar target, shown as a ring 520 worn on one or more of a user's fingers is also shown in FIG. 1B. When one or more such targets are placed on substrate 50 or otherwise within the field of view of system 10 as shown in FIG. 1B, system 10 upon locating such targets can calibrate reflectance data using known information previously stored (e.g., within memory 280 and/or 285 from such targets), or using information now acquired from the calibrated target.

Figure 1C:
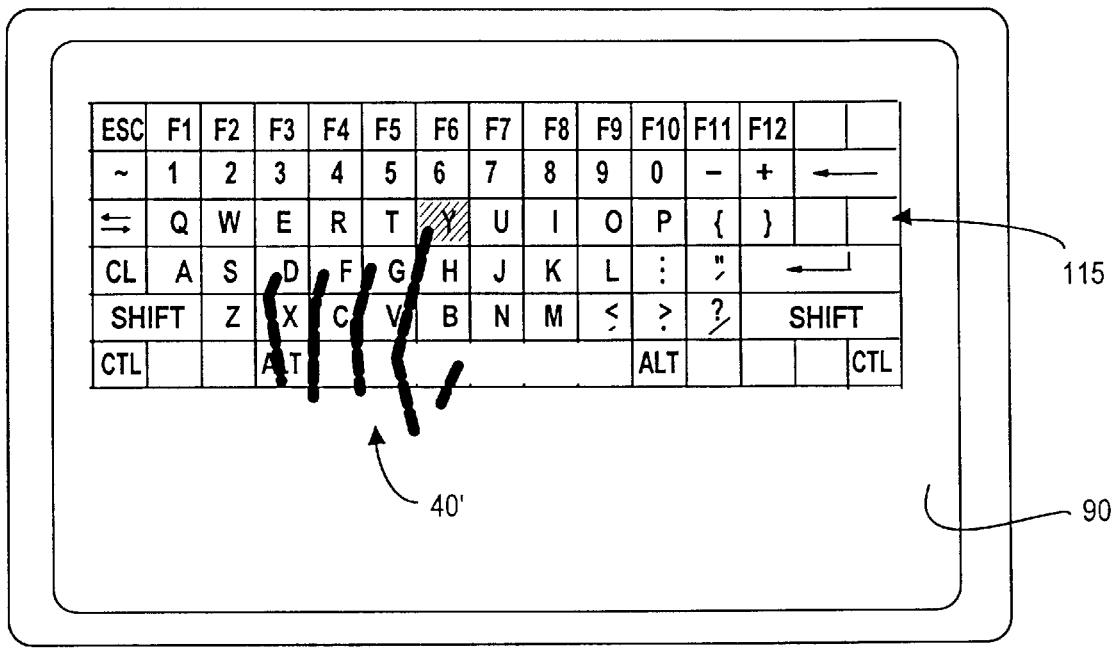
FIG. 1C depicts a companion device display of a virtual keyboard showing a user's finger contacting a virtual key, with which system the present invention may be practiced.
Figure 1D:
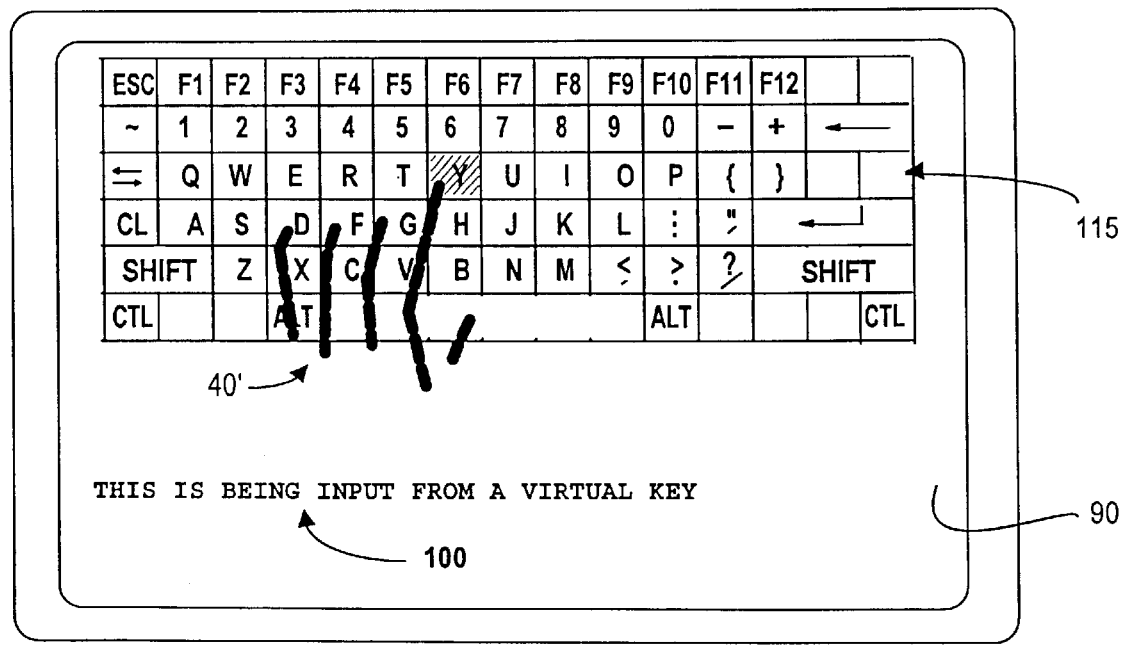
FIG. 1D depicts the display of FIG. 1C, showing additional text entered by the user on a virtual keyboard, with which system the present invention may be practiced.

As described with respect to FIGS. 1B–1D, alternatively an image of a virtual keyboard may be displayed on the screen associated with the companion device. In this embodiment, the substrate and even the work surface can be dispensed with, permitting the user to "type" in thin air, if desired. This embodiment is especially flexible in permitting on-the-fly changes in the "keyboard" being used, e.g., presenting an English language keyboard, or a German language keyboard, a Russian language keyboard, to emulate a digitizer sheet, etc. The various keyboards and keysets are simply displayed on screen 90, associated with companion device or appliance 80. Understandably, great flexibility is achieved by presenting alternative key sets as displayed images of virtual keys bearing the various character sets on the display of the companion device with which the present invention is used. Thus, in FIG. 1B, the virtual keyboard has been eliminated as a guide, further promoting portability and flexibility.

In the various embodiments, data (and/or commands) to be input by a user from a virtual keyboard 50 (as shown in FIG. 1A), or from a work surface 60 devoid of even a virtual keyboard (as shown in FIG. 1B) will be coupled to a companion computer or other system 80. Without limitation, the companion computer system or computer-like system may be a PDA, a wireless telephone, a laptop PC, a pen-based computer, or indeed any other electronic system to which is desired to input data. If a virtual keyboard is used, it preferably may be folded or rolled when not in use. The folded or rolled size may be made sufficiently small to be stored with the PDA or other companion computer system 80, with which it will be used to input data and commands. For example, when folded a keyboard may measure perhaps 2.5"×3", and preferably at least smaller than say 8"×8". A virtual keyboard for a PDA might have a folded form factor sized to fit within a pocket at the rear of the PDA. However when in used, the virtual keyboard is unfolded or unrolled to become an essentially full sized albeit virtual keyboard.

As the user inputs data into companion system 80, the display 90 that typically is present on system 80 can display in real-time the data being input 100 from the virtual keyboard, for example, text that might be input to a PDA, e-mail that might be input to a wireless telephone, etc. In one embodiment, a block cursor 102 surrounds a display of the individual alphanumeric character that the invention perceives is about to be typed, the letter "d" in FIG. 1A, for example. This visual feedback feature can help a user confirm accuracy of data entry and perhaps provide guidance in repositioning the user's fingers to ensure the desired character will be typed. Acoustic feedback such as "key clicks" can be emitted by system 80 as each virtual key is pressed to provide further feedback to the user. If desired, passive bumps 107 may be formed in the virtual keyboard to give the user tactile feedback. By way of example, such bumps may be hemispheres formed under each "key" in a virtual keyboard fabricated from a resilient plastic, for example.

As noted, visual feedback may also, or instead, be provided by displaying an image of the virtual keyboard (be it a substrate or an empty work surface in front of the companion device) on the screen of the companion device. As the user types, he or she is guided by an image of a keyboard showing the user's fingers as they move relative to the virtual keyboard. This image can include highlighting the keys directly under the user's fingers, and if a key is actually pressed, such key can be highlighted in a different color or contrast. If desired, the screen of the companion device can be "split" such that actual alphanumeric characters appear on the top portion of the screen as they are "typed", and an image of virtual keys with the user's fingers superimposed appears on the bottom portion of the screen (or vice versa).

In FIG. 1A and FIG. 1B, the companion system 80 is shown mounted in an cradle 110, to which the three-dimensional sensor 20 may be permanently attached. Alternatively, sensor 20 could be permanently mounted within a preferably lower portion of companion device 80. Output from sensor 20 is coupled via path 120 to a data input port 130 on companion device 80. If a cradle or the like is used, insertion of device 80 into cradle 110 may be used to automatically make the connection between the output of sensor 20 and the input to device 80.

As described herein, the configuration of FIG. 1B advantageously permits a user to input data (e.g., text, graphics, commands) to companion device 80, even without a printed virtual keyboard, such as was shown in FIG. 1A. For ease of understanding, grid lines along the X-axis and Y-axis are shown on a work surface region 60 in front of the companion device 80. Various software mapping techniques, described herein, permit the present invention to discern what virtual keys (if keys were present) the user's fingers intended to strike. Whereas the embodiment of FIG. 1A allowed tactile feedback from a virtual keyboard, the embodiment of FIG. 1B does not. Accordingly it is preferred that screen 90 of device 80 display imagery to assist the user in typing. Of course, as in the embodiment of FIG. 1A, device 80 may emit acoustic key click sounds as the user's fingers press against surface 60 while "typing".

FIG. 1C depicts one sort of visual assistance available from an appropriate device 80, which assistance may of course be used with the embodiment of FIG. 1A. In FIG. 1C, screen 90 displays at least part of an image of a keyboard 115 and an outline or other representation 40' of the user's hands, showing hand and finger location relative to where keys would be on an actual or a virtual keyboard. For ease of illustration, FIG. 1C depicts only the location of the user's left hand. As a key is "touched" or the user's finger is sufficiently close to "touching" a key (e.g., location on surface 60 at which such key would be present if a keyboard were present), device 80 can highlight the image of that key (e.g., display the relevant "softkey"), and as the key is "pressed" or "typed upon", device 80 can highlight the key using a different color or contrast. For example in FIG. 1C, the "Y" key is shown highlighted or contrasted, which can indicate it is being touched or is about to be touched, or it is being pressed by the user's left forefinger. As shown in FIG. 1D, a split screen display can be provided by device 80 in which part of the screen depicts imagery to guide the user's finger placement on a non-existent keyboard, whereas another part of the screen shows data or commands 100 input by the user to device 80. Although FIG. 1D shows text that corresponds to what is being typed, e.g., the letter "Y" in the word "key" is highlighted as spelling of the word "key" on screen 90 is completed, data 100 could instead be a graphic. For example, the user can command device 80 to enter a graphics mode whereupon finger movement across surface 60 (or across a virtual keyboard 70) will produce a graphic, for example, the user's signature "written" with a forefinger or a stylus on surface 60. Collectively, user finger(s) or a stylus may be referred to as a "user digit".

Optionally software associated with the invention (e.g., software 285 in FIG. 3) can use word context to help reduce "typing" error. Assume the vocabulary of the text in a language being input is known in advance, English for example. Memory in the companion device will store a dictionary containing most frequently used words in the language and as the user "types" a word on a virtual keyboard or indeed in thin air, the companion device software will match letters thus far typed with candidate words from the dictionary. For instance, if the user enters "S", all words starting with letter "S" are candidates; if the user enters "SU", all words starting with "SU" are candidates. If the user types "SZ" then, at least in English, there will be no matching candidate word(s). As the user types more letters, the set of candidate words that can match the word being typed reduces to a manageable size. At some threshold point, for instance when the size of the candidate words reduces to 5–10 words, the software can assign a probability to the next letter to be typed by the user. For instance, if the user has entered "SUBJ", there is a higher probability that the next letter is the letter "E", rather than say the letter "W". But since letters "E" and "W" are neighbors on a real or virtual keyboard, it is possible that the user might press the region near the key for the letter "W". In this example, companion device software can be used to correct the key entry and to assume that the user meant to enter the letter "E".

Turning now to operation of three-dimensional sensor 20, the sensor emits radiation of a known frequency and detects energy returned by surfaces of objects within the optical field of view. Emitted radiation is shown in FIGS. 1A and 1B as rays 140. Sensor 20 is aimed along the Z-axis to determine which of the user's finger tips 30 touch what portions of template 70, e.g., touch which virtual keys, in what time order. As shown in FIG. 1B, even if template 70 were absent and the user simply typed on the work space in front of device 80, sensor 20 would still function to output meaningful data. In such an embodiment, screen 90 of companion device 80 could display an image 100' of a keyboard 105 in which "pressed" or underlying "keys" are highlighted, such as key 107, for the letter "T".

As shown in FIGS. 1A and 1B, if desired a light or other projector 145 that emits visual light beams 147 could be used to project an image of a virtual keyboard to guide the user in typing. For example, a source of visible light (perhaps laser light in a visible wavelength) may be used with diffraction type lenses to project an image to guide the user in typing. In such embodiments, the image of a keyboard, perhaps rendered in a common graphics file format (e.g., GIF) is used to "etch" a diffractive pattern on the lens. Although portions of the projected image would at times fall on the surface of the user's fingers, nonetheless in the absence of a substrate to type upon, such a projected guide can be useful. The use of diffractive optics including such optics as are commercially available from MEMS Optical, LLC of Huntsville, Ala. 35806 may find application in implementing such a projection embodiment.

Figure 3:
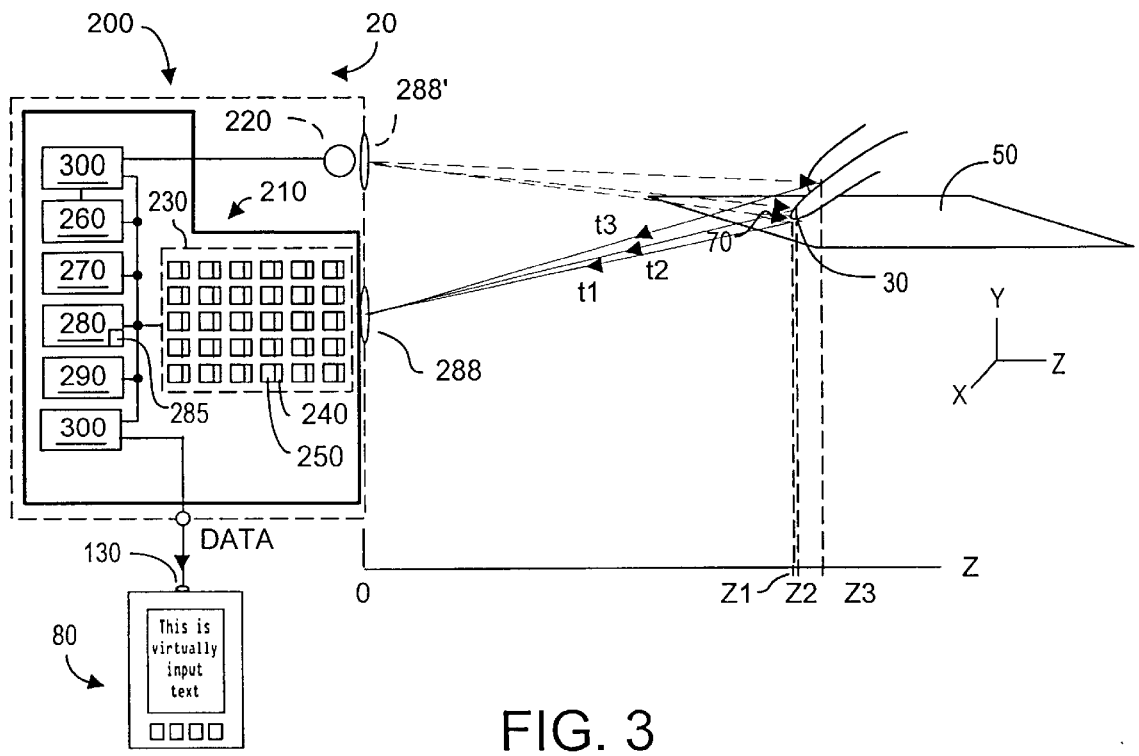
FIG. 3 is a block diagram of a n exemplary implementation of a three-dimensional signal processing and sensor system, with which the present invention may be practiced.

FIG. 3 is a block diagram depicting an exemplary three-dimensional image sensor system 200 that preferably is fabricated on a single CMOS IC 210. System 200 may be disposed in the same housing as three-dimensional sensor 20, and is used to implement the present invention. As described in greater detail in co-pending U.S. application Ser. No. 09/401,059, now U.S. Pat. No. 6,323,942 incorporated herein by reference, such a system advantageously requires no moving parts and relatively few off-chip components, primarily an light emitting diode (LED) or laser source 220 and associated optical focusing system, and if suitable shielding were provided, one might bond laser source 220 onto the common substrate upon which IC 210 is fabricated. It is to be understood that while the present invention is described with respect to a three-dimensional sensor 20 as disclosed in the above-referenced co-pending U.S. utility patent application, the invention may be practiced with other three-dimensional sensors.

System 200 includes an array 230 of pixel detectors 240, each of which has dedicated circuitry 250 for processing detection charge output by the associated detector. In a virtual keyboard recognition application, array 230 might include 15×100 pixels and a corresponding 15×100 processing circuits 250. Note that the array size is substantially less than required by prior art two-dimensional video systems such as described by Korth. Whereas Korth requires a 4:3 aspect ratio or perhaps in some cases 2:1, the present invention obtains and processes data using an aspect ratio substantially less than 3:1, and preferably about 2:15 or even 1:15. Referring to FIGS. 1A and 1B, it is appreciated that while a relatively large X-axis range must be encompassed, the edge-on disposition of sensor 20 to substrate 50 means that only a relatively small Y-axis distance need be encompassed. During user typing, a high frame rate is required to distinguish between the user's various fingers along a row of virtual keys. However, the back and forth movement of a given typing finger is less rapid in practice. Accordingly the rate of acquisition of Z-axis data may be less than X-axis and Y-axis date, for example 10 frames/second for Z-axis data, and 30 frames/second for X-axis and for Y-axis data.

A practical advantage of a decreased Z-axis frame rate is that less electrical current is required by the present invention in obtaining keyboard finger position information. Stated differently, the present invention permits using a less expensive and lower power-consuming emission source 220 than might otherwise be the case. Indeed, in signal processing acquired information, the present invention can average Z-axis information over frames, for example examining one-third of the frames for Z-axis position information. Acquired Z-axis values will have noise or jitter that can be reduced by averaging. For example Z-values may be averaged over three successive thirty frame/second frames such that three consecutive image frames will share the same processed Z-values. While the effective frame rate for Z-values is lowered to one-third the acquisition rate for X-axis and Y-axis data acquisition, accuracy of the Z data is improved by averaging out the noise or jitter. The resultant decreased Z-axis frame rate is still sufficiently rapid to acquire meaningful information. This use of different frame rates for X-values and Y-values, versus Z-values is useful to the present invention. For example, a reduced acquisition rate of Z-axis data relative to X-axis and Y-axis data minimizes electrical current drain, and avoids taxing the signal processor (CPU 260) with redundant signal processing.

Thus, the present invention acquires three-dimensional image data without requiring ambient light, whereas prior art Korth-like systems acquire two-dimensional luminosity data in the presence of ambient light. In essence, the present invention can sense three-dimensionally objects, e.g., fingers and substrate, analogously to a human's feeling an object by touching. Advantageously, this can be accomplished using relatively small operating power, e.g., perhaps 3.3 VDC at 10 mW, which permits the present invention to be battery operated and fabricated in a relatively small and mobile form factor.

Multiple frames per second of three-dimensional image data of the user's hands and fingers and the substrate are available from array 230. Using this data the present invention constructs a three-dimensional image of the hands and fingers relative to the substrate, or if the substrate is absent, relative to where virtual keys would be if a keyboard were on the work surface in front of the companion device 80. Exemplary techniques for doing so are described in applicant Bamji's earlier referenced co-pending U.S. patent application. Constructing such a three-dimensional image from time-of-flight data is superior to prior art methods that attempt to guess at spatial relationships using two-dimensional luminosity based data, e.g., as suggested by Korth. It should be noted that time of flight methods may include return pulse time measurement, phase or frequency detection, or a high speed shutter method, as described in the Bamji patent application. Other methods that do not rely on time-of-flight can capture three-dimensional data, including stereo imagery, and luminosity-based techniques that discern depth from reflective intensity.

In practice, array 230 can acquire and generate data at 30 frames/second, a frame rate sufficient to process virtual typing of 5 characters/second, which is about 60 words/minute. If array 230 is rectangular, e.g., comprising a number n of X-axis pixels and a number m Y-axis pixels, if n=100 and m=15, then a grid comprising 1,500 pixels is formed. For each frame of data, each pixel in array 230 will have a value representing the vector distance from sensor 20 to the surface of the object (e.g., a portion of a user's finger, a portion of the substrate, etc.) captured by that pixel, e.g., a vector or Z-value. This data is far more useful than Korth's luminosity-based image data that at best provided video frames with RGB grey or color scale values in determining the contour of a user's fingers and location on a virtual keyboard, in two dimensions.

Use of acquired three-dimensional data permits software 285 to determine the actual shape of the user's fingers (nominally assumed to be somewhat cylindrical), and thus relative finger position with respect to other fingers, to location over or on the substrate, and relative to three-dimensional sensor 20. In FIG. 1A, for example, as a finger is sensed to be moving to a Y=0 position, it can be determined that the finger is probably preparing to type a virtual key. If that finger is also sensed to be approaching the Z=Z1 region, then that finger is probably prepared to type a virtual key in the first row of keys on the virtual keyboard. Determination of whether a virtual key is about to be pressed also takes into account velocity data. For example, a user finger detected to be moving rapidly downward toward Y=0 is probably getting ready to strike a virtual key.

In FIG. 3, IC 210 will also include a microprocessor or microcontroller unit 260 (denoted CPU), random access memory 270 (RAM) and read-only memory 280 (ROM), a portion of which ROM preferably holds a software routine 285 executable by the CPU to implement the present invention. Controller unit 260 preferably is a 16-bit RISC microprocessor operating at perhaps 50 MHz. Among other functions, CPU 260 performs vector distance to object and object velocity calculations, where the object is the substrate and user's hands. IC 210 further includes a high speed distributable clock 290, and various computing, optical drive input/output (I/O) circuitry 300, and interface data/command input/output (I/O) circuitry 310. Digital keyboard scan type data or digitizer tablet/mouse type data is output from I/O 310, for example from COM and/or USB type ports associated with system 200.

Preferably the two-dimensional array 230 of pixel sensing detectors is fabricated using standard commercial silicon technology, which advantageously permits fabricating circuits 250, 260, 270, 280, 290, and 300 on the same IC 210. Understandably, the ability to fabricate such circuits on the same IC with the array of pixel detectors can shorten processing and delay times, due to shorter signal paths.

Each pixel detector may be represented as a parallel combination of a current source, an ideal diode, and shunt impedance and noise current source. Each pixel detector will output a current proportional to the amount of incoming photon light energy falling upon it. Preferably CMOS fabrication is used to implement the array of CMOS pixel diodes or photogate detector devices. For example photodiodes may be fabricated using a diffusion-to-well, or a well-to-substrate junction. Well-to-substrate photodiodes are more sensitive to infrared (IR) light, exhibit less capacitance, and are thus preferred.

Figure 4:
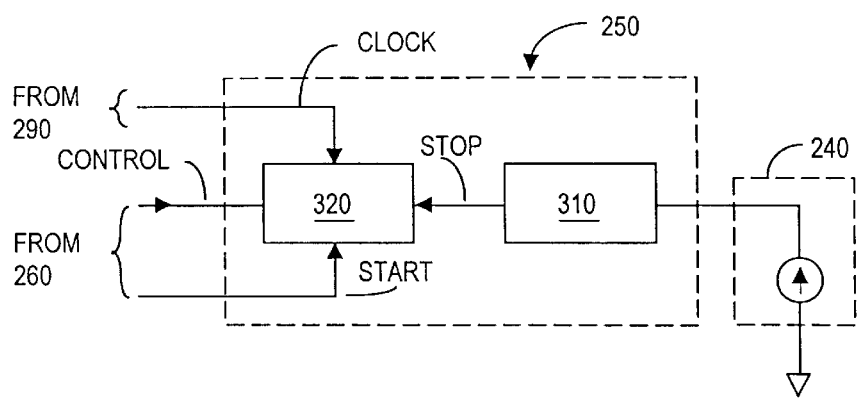
FIG. 4 is a block diagram of an exemplary single pixel detector with an associated photon pulse detector and high speed counter as may be used in a three-dimensional sensor system, with which system the present invention may be practiced.

As shown in FIGS. 3 and 4, a circuit 250 is associated with each pixel detector 240. Each circuit 250 preferably includes a pulse peak detector 310, a high speed counter 320, and has access to the high speed clock 290. Preferably formed on IC 210, high speed clock 200 outputs a continuous train of high frequency clock pulses preferably at a fixed frequency of perhaps 500 MHz, preferably with a low duty cycle as the pulses are output. Of course, other high speed clock parameters could instead be used. This pulse train is coupled to the input port of each high speed interpolating counter 320. Counter 320 preferably can sub-count, as described in the Bamji pending patent application, and can resolve times on the order of 70 ps. Preferably each counter 320 also has a port to receive a START signal (e.g., start now to count), a port to receive a STOP signal (e.g., stop counting now), and a port to receive a CONTROL signal (e.g., reset accumulated count now). The CONTROL and START signals are available from controller 260, the CLOCK signal is available from clock unit 290, and the STOP signal is available from pulse peak detector 310.

Virtual keyboard 50 will be placed perhaps b 20cm distant from three-dimensional sensor 20, substantially in the same plane as the sensor lens. Since a typical sensor lens angle is perhaps 60°, a 20 cm distance ensures optical coverage of the virtual keyboard. In FIG. 3, for ease of illustration the distance between sensor 20 light emissions and collected light has been exaggerated.

In overview, system 200 operates as follows. At time t0, microprocessor 260 commands light source 220 to emit a pulse of light of known wavelength, which passes through focus lens 288' and travels at the speed of light (C), 300,000 km/sec. toward objects of interest, e.g., substrate 50 and user's fingers 30. If light source 220 is sufficiently powerful, lens 288' may be dispensed with. At the surface of the object being imaged at least some of the light may be reflected back toward system 200 to be sensed by the detector array. In FIG. 3, the objects of interest are the fingers 30 of a user's hand, and, if present, substrate 50, which as noted may include viewable indicia such as keyboard keys 70 or perhaps projected grid lines, to guide the user in finger placement while "typing".

As was indicated by FIG. 1A, the position of virtual keys 70 (or other user available indicia) on substrate 50 is known in two dimensions on the X-Z plane relative to the position of other such keys on the substrate. As the user's fingers move back and forth over substrate 50, touching virtual keys 70 while "typing", it is a function of CPU 260 and software routine 285 to examine return optical energy to identify which, if any, virtual keys are being touched by the user's fingers at what times. Once this information is obtained, appropriate KEYUP, KEYDOWN, and key scan code or other output signals may be provided to input port 130 of the companion device 80, just as though the data or commands being provided were generated by an actual keyboard or other input device.

At or before time t0, each pixel counter 310 in array 230 receives a CONTROL signal from controller 260, which resets any count previously held in the counter. At time t0, controller 260 issues a START command to each counter, whereupon each counter begins to count and accumulate CLOCK pulses from clock 290. During the roundtrip time of flight (TOF) of a light pulse, each counter accumulates CLOCK pulses, with a larger number of accumulated clock pulses representing longer TOF, which is to say, greater distance between a light reflecting point on the imaged object and system 200.

The fundamental nature of focus lens 288 associated with system 200 is such that reflected light from a point on the surface of imaged object 20 will only fall upon the pixel in the array focused upon such point. Thus, at time t1, photon light energy reflected from the closest point on the surface of object 20 will pass through a lens/filter 288 and will fall upon the pixel detector 240 in array 230 focused upon that point. A filter associated with lens 288 ensures that only incoming light have the wavelength emitted by light source 220 falls upon the detector array unattenuated.

Assume that one particular pixel detector 240 within array 230 is focused upon a nearest surface point on the tip 70 of the nearest user's finger. The associated detector 300 will detect voltage that is output by the pixel detector in response to the incoming photon energy from such object point. Preferably pulse detector 300 is implemented as an amplifying peak detector that senses a small but rapid change in pixel output current or voltage. When the rapidly changing output voltage is sufficiently large to be detected, logic within detector 300 (e.g., an SR flipflop) toggles to latch the output pulse, which is provided as the STOP signal to the associated counter 320. Thus, the number of counts accumulated within the associated counter 320 will be indicative of roundtrip TOF to the near portion of the fingertip in question, a calculable distance Z1 away.

Distance Z1 may be determined from the following relationship in which C is the velocity of light:

$$Z1 = C \cdot (t1 - t0)/2$$

At some later time t2 photon energy will arrive at lens 288 from a somewhat more distant portion of the user's fingertip, 30, and will fall upon array 230 and be detected by another pixel detector. Hitherto the counter associated with this other detector has continued to count CLOCK pulses starting from time t0, as indeed have all counters except for the counter that stopped counting at time t1. At time t2, the pulse detector associated with the pixel just now receiving and detecting incoming photon energy will issue a STOP command to the associated counter. The accumulated count in this counter will reflect roundtrip TOF to the intermediate point on the fingertip, a distance Z2 away. Within IC 210, controller 260 executing software routine 285 stored in memory 280 can calculate distance associated with the TOF data for each light reflecting point on the object surface. Velocity can be calculated by examining successive frames of acquired data.

In similar fashion, at time t3 yet another pixel detector in the array will detect sufficient just-arriving photon energy for its associated pulse detector 300 to issue a STOP command to the associated counter. The accumulated count in this counter represents TOF data for a still farther distance Z3 to the imaged object. Although for ease of illustration FIG. 3 shows but three emitted light rays and light reflections, all falling near one fingertip, in practice substantially all of the substrate and user's fingers and thumbs will be subjected to illumination from light source 220, and will reflect at least some energy into lens 288 associated with three-dimensional sensor 20.

Some pixels in the array may of course not receive sufficient reflected light from the object point upon which they are focused. Thus, after a predetermined amount of time (that may be programmed into controller 260), the counter associated with each pixel in the sensor array will have been stopped due to pulse detection (or will be assumed to hold a count corresponding to a target at distance Z infinity).

As noted, in the present application it suffices if system 200 can accurately image objects within a range of perhaps 20 cm to 30 cm, e.g., about 20 cm plus the distance separating the top and the bottom "row" of virtual keys on substrate 50. With each detected reflected light pulse, the counter-calculated TOF distance value for each pixel in the array is determined and preferably stored in a frame buffer in RAM associated with unit 270. Preferably microprocessor 260 examines consecutive frames stored in RAM to identify objects and object location in the field of view. Microprocessor 260 can then compute object, e.g., finger movement velocity. In addition to calculating distance and velocity, the microprocessor and associated on-chip circuitry preferably are programmed to recognize the outline or contours of the user's fingers, and to distinguish the finger surfaces from the substrate surface. Once the finger contours are identified, system 200 can output via a COM or USB or other port relevant digital data and commands to the companion computer system.

The above example described how three pixel detectors receiving photon energies at three separate times t1, t2, t3 turn-off associated counters whose accumulated counts could be used to calculate distances Z1, Z2, Z3 to finger surfaces and the substrate in the field of view. In practice, the present invention will process not three but thousands or tens of thousands of such calculations per each light pulse, depending upon the size of the array. Such processing can occur on IC chip 210, for example using microprocessor 260 to execute routine 285 stored (or storable) in ROM 280. Each of the pixel detectors in the array will have unique position locations on the detection array, and the count output from the high speed counter associated with each pixel detector can be uniquely identified. Thus, TOF data gathered by two-dimensional detection array 230 may be signal processed to provide accurate distances to three-dimensional object surfaces, such as a users fingers and a substrate. It will be appreciated that output from CMOS-compatible detectors 240 may be accessed in a random manner if desired, which permits outputting TOF DATA in any order.

Light source 220 is preferably an LED or a laser that emits energy with a wavelength of perhaps 800 nm, although other wavelengths could instead be used. Below 800 nm wavelength, emitted light starts to become visible and laser efficiency is reduced. Above 900 nm CMOS sensor efficiency drops off rapidly, and in any event, 1100 nm is the upper wavelength for a device fabricated on a silicon substrate, such as IC 210. As noted, by emitted light pulses having a specific wavelength, and by filtering out incoming light of different wavelength, system 200 is operable with or without ambient light. If substrate 50 contained, for example, raised ridges defining the outlines of virtual keys, a user can literally type in the dark and system 200 would still function properly. This ability to function without dependence upon ambient light is in stark contrast to prior art schemes such as described by Korth. As noted, even for users who are not accomplished touch typists, the present invention may be used in the dark by providing an image of a virtual keyboard on the display of companion device 80.

As noted, lens 288 preferably focuses filtered incoming light energy onto sensor array 230 such that each pixel in the array receives light from only one particular point (e.g., an object surface point) in the field of view. The properties of light wave propagation allow an ordinary lens 288 to be used to focus the light onto the sensor array. If a lens is required to focus the emitted light, a single lens could be used for 288, 288' if a mirror-type arrangement were used.

In practical applications, sensor array 230 preferably has sufficient resolution to differentiate target distances on the order of about 1 cm, which implies each pixel must be able to resolve time differences on the order of about 70 ps (e.g., 1 cm/C). In terms of a CMOS-implemented system specification, high speed counters 320 must be able to resolve time to within about 70 ps, and peak pulse detectors 310 must be low-noise high speed units also able to resolve about 70 ps (after averaging about 100 samples) with a detection sensitivity on the order of perhaps a few hundred microvolts ($\mu$V). Accurate distance measurements will require that the pulse detector response time be removed from the total elapsed time. Finally, the CLOCK signal output by circuit 280 should have a period on the order of about 2 ns.

As noted above, each interpolating counter 320 preferably can resolve distances on the order of 1 cm, which implies resolving time to the order of about 70 ps. Using a 10-bit counter with an effective 70 ps cycle time would yield a maximum system detection distance of about 10 m (e.g.,1,024 cm). Implementing an ordinary 10-bit counter would typically require a worst case path of perhaps 40 gates, each of which would require typically 200 ps, for a total propagation time of perhaps about 8 ns. This in turn would limit the as test system clock cycle time to about 10 ns. Using carry look-ahead hardware might, at a cost, reduce counter propagation time, but nonetheless a 2 ns system cycle time would be quite difficult to implement.

To achieve the required cycle time, a so-called pseudo random sequence counter (PRSC), sometimes termed a linear shift register (LSR), may be used. Details for implementing high speed counters including PRSC units may be found in applicant's earlier-referenced co-pending utility patent application.

Figure 5:
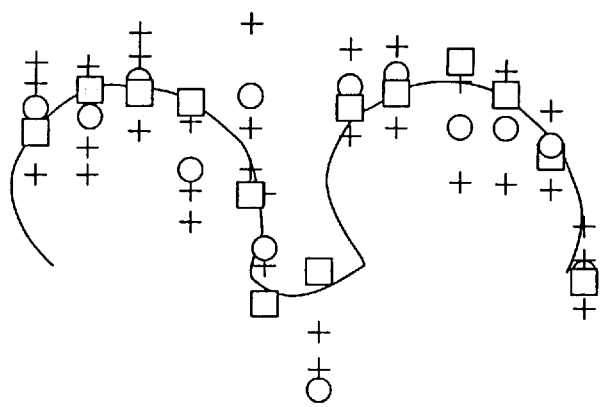
FIG. 5 depicts contour recognition of a user's fingers, according to the present invention.
Figure 6:
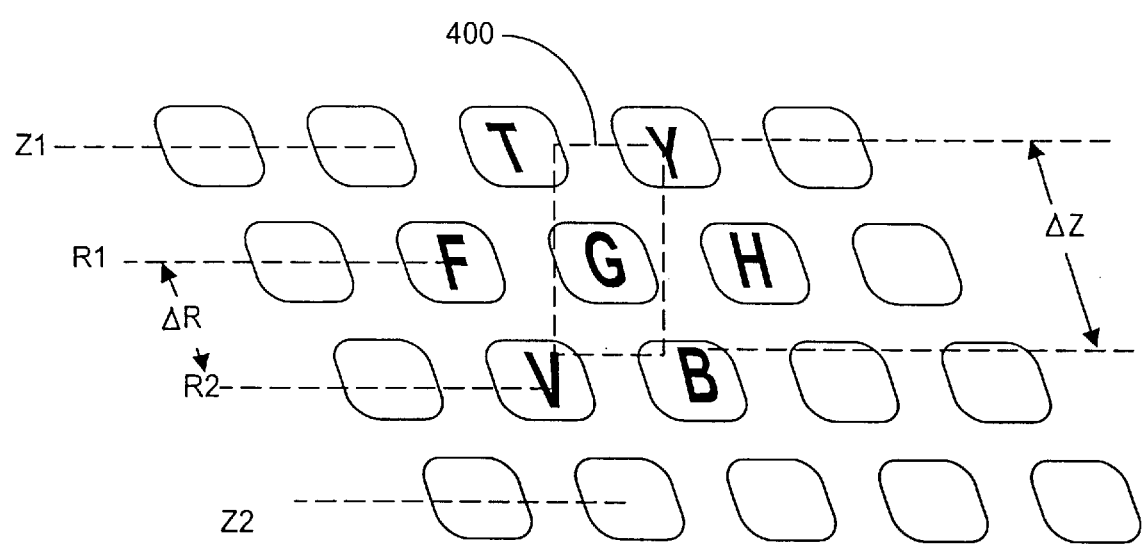
FIG. 6 depicts use of staggered key locations in identifying a pressed virtual key, according to the present invention.

Considerations involved in recognizing contour of the user's fingers within the optical field of view will now be described with reference to FIG. 5, which depicts a cross-section of two of the user's fingers. The + symbols show sub-frame (intra-frame) samples of vector distance values for each pixel sensor in array 210 imaging the fingers. Inherent noise associated with the pixel sensors produces varying vector distances to the same point of the imaged finger object in each acquired sample. To reduce noise and improve signal/noise, the sensor averages out measurements for each pixel to produce average values for the frame, shown by the ○ symbol in FIG. 5. The □ symbol in FIG. 5 represents the corrected average when a template, or set of stored exemplary finger-shaped cross-sections, is used by routine 285 to interpret the average values. This method enhances distance measurement accuracy, and reduces ambiguity in recognizing the user's fingers.

Data capture noise can affect the minimum frame rate needed to recognize the user's fingers and determine finger motion and velocity. In TOF-based imagery, as used in the present invention, pixel-level noise manifests itself as variations in distance values for a given pixel, from one frame to another frame, even if the imaged object remains stationary.

For ease of illustration, the keyboard images depicted in FIGS. 1A and 2A, 2B were drawn as a matrix, e.g., uniform rows and columns. But in practice, as shown partially in FIG. 6, standard QWERTY-type keyboards (and indeed keyboards with other key configurations) are laid out in an offset or staggered configuration. The present invention advantageously reduces the requirement for Z-axis resolution by taking into account the staggering of actual keyboard layouts. Thus, the second row from the top of a keyboard is shifted slightly to the right, and the third row (from the top) is shifted further to the right, and so on. This staggering places the keys in each row at an offset position with respect to the keys in the adjacent row. By way of example, note the keyboard letter "G" in FIG. 6. Dotted rectangle 400 indicates allowable latitude given a user in striking the letter "G", e.g., any virtual contact within the rectangle area will unambiguously be interpreted as user finger contact on the letter "G". The height of this rectangle, denoted by Z is the maximum error margin allowed in detecting a Z-axis coordinate. Note that this margin is greater than the height of a single row R in a QWERTY keyboard. It is also noted that the region of recognition for a key need not be rectangular, and may be of any reasonable shape, for example, an ellipse centered at the key.

As acquired frames of three-dimensional data become available to CPU 270 and to routine 285, recognition of the user's fingers from the acquired data proceeds. This task is simplified in that the data indeed includes a three-dimensional representation of the user's fingers, and the fingers will have a reasonably well known shape, e.g., when viewed edge-on, they are somewhat cylindrical in shape. As noted, storing exemplary templates of finger shapes and finger and hand heuristics in memory 280 expedites finger recognition by reducing CPU time needed to recognize and track finger positions. Such signal processing can quickly reduce data capture noise and more readily discern the user's fingers from among the three-dimensional data acquired. Signal to noise ratio can also be improved in intra-frame states in that knowledge of the scene being imaged is known, e.g., the scene comprises a virtual keyboard and user's hands. Preferably a few hundred data captures are averaged or otherwise used to construct a frame of acquired data.

Once the user's fingers are recognized, software routine 285 (or an equivalent routine, perhaps executed by other than CPU 260, can next determine position and motion (e.g., relative change of position per unit time) of the fingers. Since data representing the fingers are in three dimensions, routine 285 can readily eliminate background images and focus only on the user hands. In a Korth two-dimensional imaging scheme, this task is very difficult as the shape and movement of background objects (e.g., a user's sleeve, arm, body, chair contour, etc.) can confuse object tracking and recognition software routines.

Using contour of the finger tips, routine 285 uses Z-axis distance measurements to determine position of the fingers with respect to the rows of the virtual keyboard, e.g., distance Z1 or Z2 in FIG. 1A. As noted, the granularity of such axis measurements is substantially greater than what is depicted in FIG. 1A. X-axis distance measurements provide data as to fingertip position with respect to the columns of the virtual keyboard. Using row and column co-ordinate numbers, software 285 can determine the actual virtual key touched by each finger, e.g., key "T" by the left forefinger in FIG. 1A.

To help the user orient the fingers on a particular virtual input device such as a keyboard, numeric pad, telephone pad, etc., software within the companion device 80 can be used to display a soft keyboard on a screen 90 associated with the device (e.g., a PDA or cellular telephone screen), or on a display terminal coupled to device 80. The soft keyboard image will show user finger positions for all keys on (or close to) virtual keyboard 50, for example by highlighting keys directly under the user's fingers. When a key is actually struck (as perceived by the user's finger movement), the struck key may be highlighted using a different color or contrast. If the virtual keys are not in a correct rest position, the user can command the companion device to position the virtual keyboard or other input device in the proper starting position. For instance, if the user typically begins to key by placing the right hand fingers on home row J, K, L, and ":" keys, and the left fingers on F, D, S and A keys, the software will move the keys of the virtual keyboard to such a position.

Vertical Y-axis motion of the user's fingers is sensed to determine what virtual keys on device 50 are being typed upon, or struck. While typing on a mechanical keyboard several fingers may be in motion simultaneously, but normally only one finger strikes a key, absent double key entries such pressing the CONTROL key and perhaps the "P" key, or absent a typographical error. In the present invention, software routine 285 determines finger motion information from successive frames of acquired information. Advantageously, the human hand imposes certain restrictions upon finger motion, which restrictions are adopted in modeling an image of the user's hands and fingers. For example, a connectiveness property of the fingers imposes certain coupling between movement of the fingers. The degree of freedom at the finger joints gives certain freedom to each finger to move, for example to move nearer or further from other fingers. Routine 285 advantageously can employ several heuristics to determine what virtual key is actually being struck. For instance, a keystroke can be sensed as commencing with a detected finger up movement followed by a quick finger down motion. A user's finger having the smallest Y-axis position or the greatest downward velocity is selected as the key entry finger, e.g., the finger that will strike one of the virtual keys on the virtual data input device. Unintended key entry by a user is discerned by intelligently monitoring movement of the user's fingers. For example, the user may rest the fingers on a surface of substrate 50 without triggering unintended key entries. This is analogous to a condition where a typist using a mechanical keyboard rests his or her fingers on the keys without pressing any key sufficiently hard to type. A user of the present invention is also permitted to move his or her fingers gently over the virtual keyboard without unintentional triggering any key. Software 285 can calibrate its operation such that only intentional gestures are admitted as valid key entry to input data or commands to the companion computer device 80.

Software 285 upon execution by a CPU such as CPU 270 may be used to implement an algorithm or routine to recognize what virtual keys are being typed upon by a user of the present invention. Input data for the algorithm is three-dimensional optical information obtained from sensor 20. An exemplary algorithm may be considered as having three phases: building and personalizing templates, calibration, and actually tracking user typing on a virtual keyboard or work surface. In the description that follows it will be assumed that normal typing is undertaken in which all fingers are used. For instances where one or two fingers only are used, a special case of the algorithm will apply.

Templates are understood to be predefined models of different typing posture for different users. This class of templates is based upon analysis of a population of system users, whose various typing styles will have been classified. It is to be noted that the templates may be derived from examples of input data (e.g examples of data collected by observing fingers in typing position) or from a preprogrammed mathematical description of the geometrical properties of the objects to be tracked (e.g. a cylindrical description for fingers). The resultant templates may be created at the time ROM 280 and especially routine 285 is fabricated. Since the position and shape of keyboard keys imposes certain commonalities of style upon users, it will be appreciated that the number of predefined templates need not be excessively large.

Preferably individual users of the present invention can also construct their own dedicated templates using a training tool that guides the user through the steps needed to build a template. For instance, a training program portion of software 285 can present on display 90 commands telling the user to place his or her fingers in typing position on the virtual keyboard, if present, or the work surface in front of the companion device 80. The training program will then tell the user to repeatedly press a virtual key under each finger. Optically capturing thumb movement can be treated as a special case since thumb movement differs from finger movement and typically is restricted to repressing the space bar region of a virtual keyboard or work surface.

In building the template, it is desired to construct a classification of the objects in the template image as being the different fingers of the user's hands. As described in further detail following, this method step collects information for the classifier or algorithm routine as to the physical properties of the user's hand. Later, during actual typing, the classifier uses this template to quickly map image in acquired frames to each user's fingers. As part of the template construction, preferably a mapping of the positions of the user's fingers to specific keyboard keys at a rest position is defined. For instance, routine 285 and CPU 270 can instruct the companion device 80 that, at rest, the user's left hand fingers touch the :"A", "S", "D" and "F" keys, and the user's right hand fingers touch the "J", "K", "L", and ":" keys. Such method step personalizes the virtual keyboard to the style of a particular user. This personalization process is carried out once and need not be repeated unless the user's typing posture changes substantially to where too many wrong keys are being identified as having been typed upon. A calibration process according to the present invention may be carried out as follows. At the start of a typing session, the user will so signal the companion device 80 by putting the application being run by device 80 in a text input mode. For example, if device 80 is a PDA, the user can touch a text field displayed on screen 80 with a stylus or finger, thereby setting the input focus of the companion 80 application to a text field. Other companion devices may be set to the appropriate text input mode using procedures associated with such devices.

Next the user's fingers are placed in a typing position in the work surface in front of three-dimensional sensor 20, either on a virtual keyboard or simply on the work surface. This step is used to map the user fingers to the elements of the template and to calibrate the user's fingers to the keys of the virtual keyboard (or work surface) before a typing session starts.

At this juncture, three-dimensional sensor 20 will be repeatedly capturing the contour map of the user's fingers. The data thus captured will be placed, e.g., by software 285 in a table or matrix such as shown in FIGS. 7A–7O.

Figure 7A:
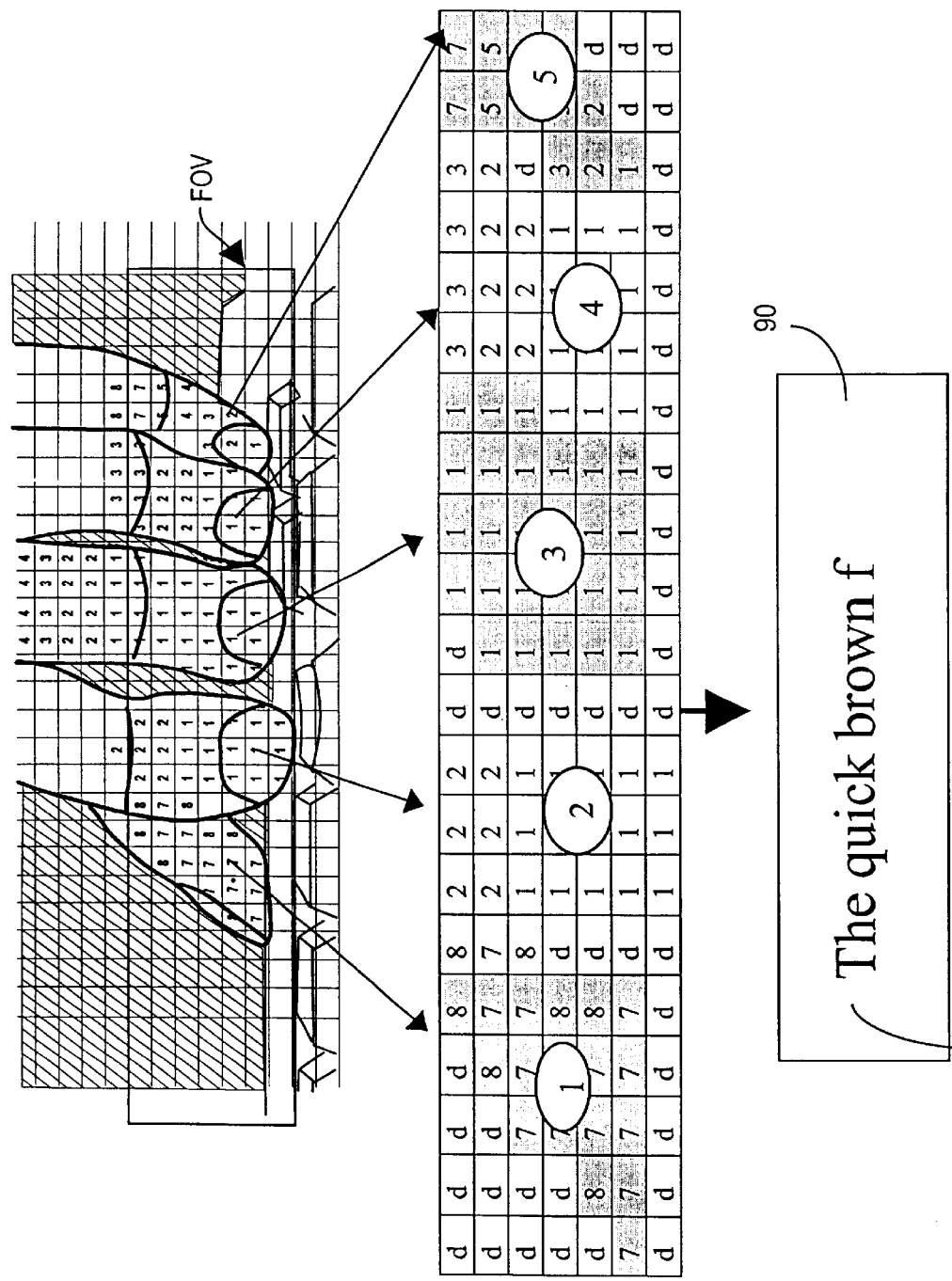

FIG. 7A depicts a user's left hand typing on an actual keyboard, as imaged by sensor 20. The field of view (FOV) of sensor 20 is intentionally directed toward the upper work surface, which in this example was an actual keyboard. Five fingers of the left hand are shown, and may be identified as fingers 1 (thumb), 2, 3, 4, and 5 (little finger). The cross-hatched region behind and between the fingers indicates regions too dark to be considered part of the user's fingers by the present invention. In an actual setting, there would of course be varying degrees of darkness, rather than the uniform dark region shown here for ease of understanding, and of depiction.

An overlay grid-like matrix or table is shown in FIG. 7A, in which various regions have quantized digits representing a normalized vector distance between the relevant surface portion of a user's finger and sensor 20. It is understood that these quantized distance values are dynamically calculated by the present invention, for example by software 285. In the mapping shown in FIG. 7A, low digit values such as 1, 2, represent close distances, and higher values such as 7, 8 represent large distances. The "d" values represent perceived discontinuities. Depending on the technology associated with sensor 20, values of "d" may oscillate widely and can indicate the absence of a foreground object. In FIG. 7A, the quantized distance values indicate that the user's left thumb is farther away from sensor 20 (as indicated by relatively high distance values of 7 and 8) than is the user's left forefinger, whose distance values are relatively low, e.g., 1. It is also seen that the user's left little finger is in generally more distance from sensor 20 than is the user's forefinger.

The central portion of FIG. 7A is a table or matrix showing the normalized distance values and, where applicable, "d" entries. A similar table is also shown in FIGS. 7B–7O. The table entries can represent contours of user fingers, and shading has been added to these tables to assist in showing potential mapping of distance data to an outline of the user's fingers. Arrows from the FOV portion of FIG. 7A pointing to columns in the table indicate how various columns of data can indeed represent contours of user finger position. In the tables shown in FIGS. 7A–7O, circled numbers "1", "2" . . . "5" depict contours corresponding to perceived location of the users left thumb (finger "1"), forefinger, middle finger, ring finger, and little finger (finger "5") respectively.

As described earlier, templates preferably are used in the present invention to help identify user finger positions from data obtained from sensor 20. Templates can assist classification algorithm (or classifier) 285 in distinguishing boundaries between fingers when discontinuities are not necessarily apparent. For example, in FIG. 7A, the third and fourth user's fingers (fingers 3 and 4) are relatively close together.

Shown at the bottom of FIG. 7A is a dynamic display of what the user is typing, based upon analysis by the present invention of the sensor-perceived distance values, dynamic velocity values, as well as heuristics associated with the overall task of recognizing what keys (real or virtual) are being pressed at what time. Thus, at the moment captured in FIG. 7A, the user's left forefinger (finger 2) appears to have just typed the letter 'f', perhaps in the sentence "The quick brown fox jumped over the lazy dog", as the partially typed phrase 100 might appear on display 90 of a companion device 80.

Preferably the calibration phase of software routine 285 is user-friendly. Accordingly, routine 285 in essence moves or relocates the virtual keyboard to under the user's fingers. Such procedure may be carried out by mapping the image obtained from sensor 20 to the fingers of the template, and then mapping the touched keys to the natural position for the user, which natural position was determined during the template construction phase.

The calibration step defines an initial state or rest position, and maps the user's fingers at rest position to specific keys on the keyboard. As shown in FIG. 1B, the "keys" 107 that are touched or very nearby (but not pressed) preferably are highlighted on a soft-keyboard 105 displayed on screen 90 of companion device 80, assuming of course that a screen 90 is available. This rest position will also be the position that the user's fingers assume at the end of a typing burst.

During actual typing, routine 285 senses the user's fingers and maps finger movements to correct keys on a virtual keyboard. Before starting this phase of the algorithm, the relevant companion device 80 application will have been put into text input mode and will be ready to accept keyboard events (e.g. KEYUP and KEYDOWN).

Routine 285 (or equivalent) may be implemented in many ways. In the preferred embodiment, routine 285 will use three modules. A "classifier" module is used to map clusters in each frame to user fingers. A "tracker" module is used to track movement of active fingers by searching for a key stroke finger motion and by determining coordinates of the point of impact between the user's finger and a location on a virtual keyboard or other work surface. A third "mapper" module maps the impact point of a user finger to a specific key on the virtual keyboard and sends a key event to the companion device 80. These exemplary modules will now be described in further detail.

The role of the classifier module is to make sense of the contour map of the scene generated by sensor 20 at each frame of optically acquired data. The cluster module will identify clusters that have certain common properties such as being part of the same surface. When a gap exists between the user's fingers, the Z information will provide accurate data to detect the finger boundaries. If adjacent fingers are touching, e.g., no gap, the classifer module preferably finds gradients of the fingers to detect the boundary. The latter condition is not of special concern because users typically do not type with adjacent fingers touching. Importantly, generally the classifier will label each cluster so that the same cluster can be identified from other clusters in successive frames of acquired data. The classifier also determines the boundaries of each cluster, and specifically determines the tip of each cluster, which tip maps to the tip of user fingers. The goal is not recognition of user fingers per se, in that for all intent and purpose the user could be holding a stick or stylus that is used to press virtual keys or virtual locations of keys. Thus the above-described template is used primarily to give meaning to these clusters and to assist in forming the clusters.

The tracker module will now be more fully described with respect to the matrices shown in FIGS. 7A–7O, in which the clusters are shaded as an aide to visually understanding the data. Perceived clusters are preferably input to a tracker module that will keep track of the movement of each cluster. The tracker module is especially alert for relatively rapid up and down movements, and will compute velocities and directions of the clusters.

FIGS. 7D–7K depict matrix tables showing a sequence of images obtained as the user's second finger rises upward and then moves downward to strike at a (virtual) key beneath the end of the finger. Preferably the tip of each cluster that is closely monitored by the tracker module will have been identified by the classifier module. In actual images, other user fingers may also move slightly, but in the example being described, the classifier determines that the rate of acceleration of the left forefinger (finger 2) is noticeably higher than the movements of the other fingers.

Figures 7E, 7F, 7G:
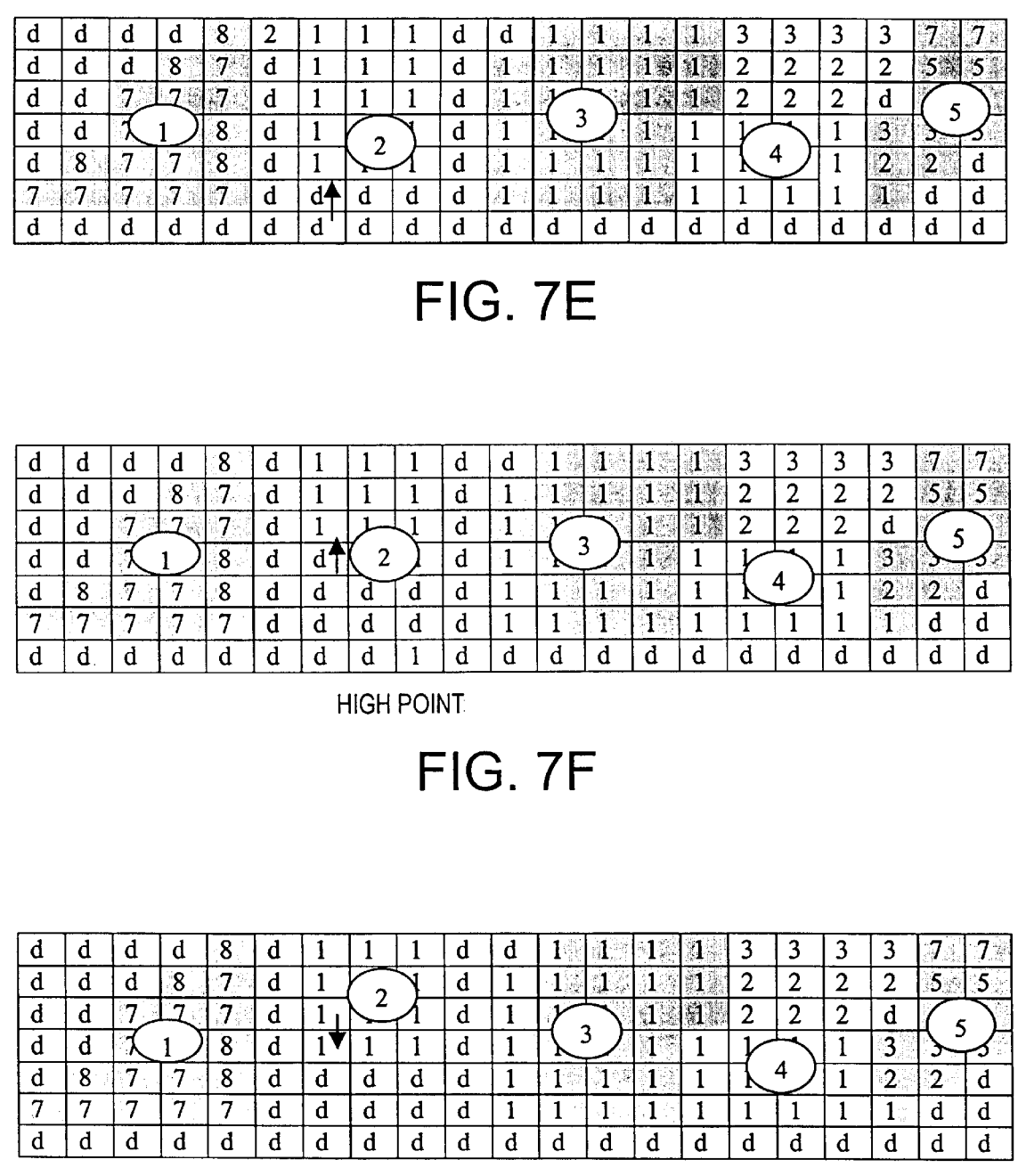
Figures 7H, 7I, 7J:
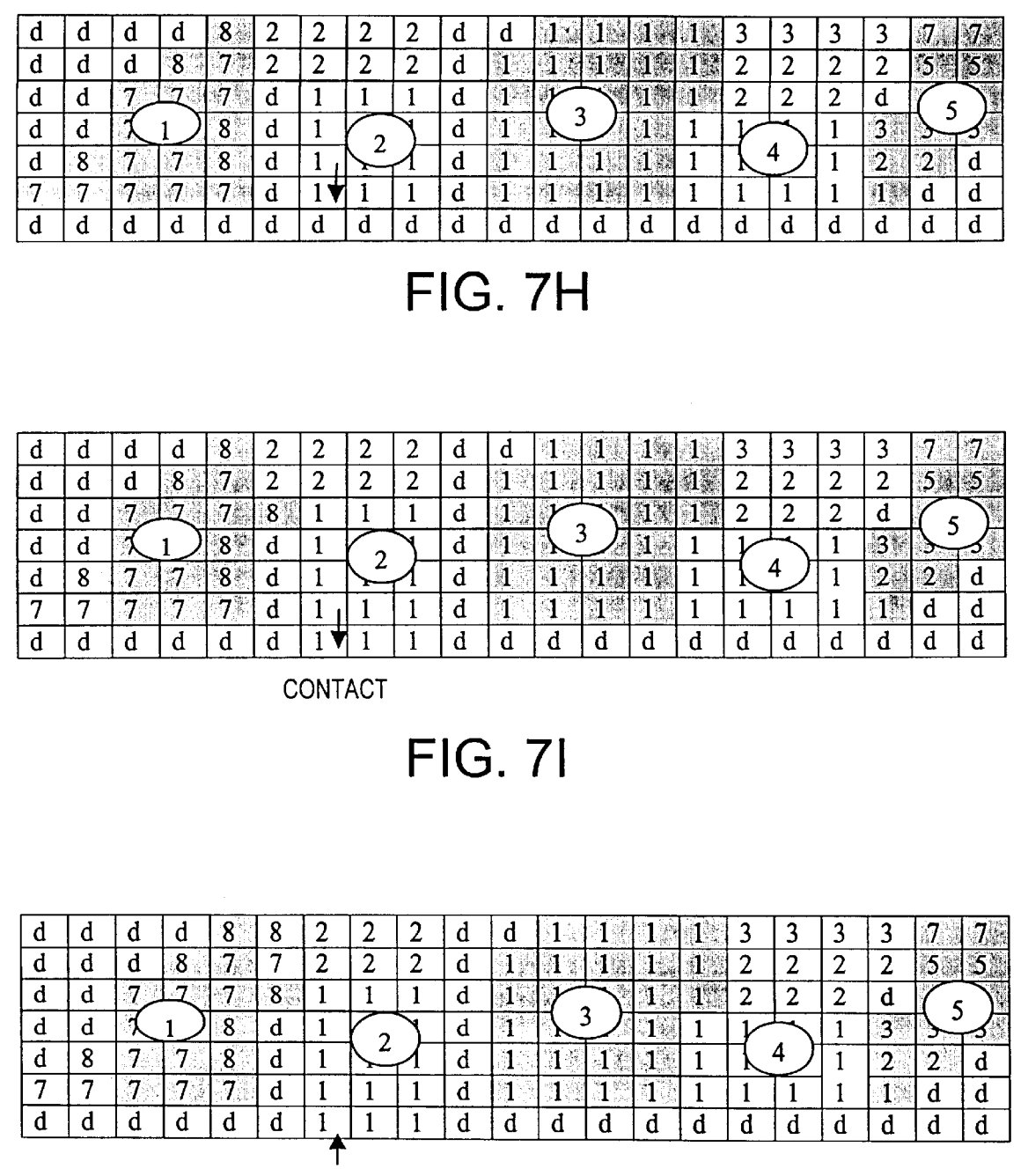

In FIGS. 7D–7E, a pointing arrow is added to show the direction and the tip of the perceived cluster (e.g., user finger). Cluster or finger movement is upward in FIGS. 7D–7F, with FIG. 7F representing a maximum upward position of the user's finger, e.g., a maximum Y-axis location as determined by sensor acquired data. In FIGS. 7G–7H, the cluster or finger is now moving downward, e.g., toward the virtual keyboard 50 or work surface 60. In FIG. 7I, contact of the user's finger with a virtual key or key location on a work surface is perceived.

Vertical velocity of a finger tip may be computed by routine 285 (or other routine) in several ways. In a preferred embodiment, the tracker module computes vertical velocity of a user's fingertip (identified by the classifier) by dividing the difference between the highest and the lowest position of the fingertip by the number of frames acquired during the sequence. The velocity is computed in terms of Y-axis resolution by number of frames, which is independent of the frame rate per second. To register a key strike, this computed Y-axis velocity must be equal or higher than a threshold velocity. The threshold velocity is a parameter that used by software 285, and preferably is user-adjustable during the personalization step.

FIGS. 7J–7O depict matrix tables in which a more complex sequence showing movement of the user's left forefinger (finger 2) in a down-and-back direction. In FIG. 7O, this finger motion is shown culminating in a key stroke on a key in the first row of the virtual keyboard (or location on a work surface in front of device 80 where such virtual key would otherwise be found).

Referring now to the mapper module, the tracker module will signal the mapper module when it determines that a keystroke has been detected, and the tracker module passes the cluster tip (X,Y,Z) coordinates of the cluster tip. The mapper module uses the Z-axis value to determine the row location on the virtual keyboard, and uses the X-axis and Y-axis values to determine the key within the row. Referring for example to FIG. 1A, a coordinate (X,Y,Z) location (7,0,3) might signify the letter "T" on a virtual keyboard. Again it is understood that the various modules preferably comprise portions of software routine 285, although other routines including routines executed other than by CPU 285 may instead be used.

Having described exemplary three-dimensional range finding systems and environments with which the present invention may be practiced to improve system performance, the present invention will be described in detail with reference to FIGS. 8–17. The present invention preferably is software implemented and preferably is executed by a CPU, e.g., CPU 260 in FIG. 3. Software implementing some or all of the embodiments of the present invention may be stored as part of (or loadable into) memory 280 and/or 285 as shown in FIG. 3.

In overview, in systems with which the present invention is preferably practiced, a sensor or preferably single camera directly measures distance from all parts of objects within a viewing cone. The sensory mechanism is definable as including a grid of sensors, preferably disposed within a single camera. Distance measurements are made using time of flight from energy emission to detection of reflected energy. This process is repeated in real time at higher than typical 30 frame/second video frame rate. Once per frame, the system coupled to the camera receives a frame buffer storing pixels, in which the value in each pixel gives distance and brightness of the object mapped to that pixel. (In some literature, the term voxel is used when referring to a pixel having depth information; however, the term pixel will be retained herein.) In an ordinary camera, the digitized frame buffer returns an image having a color (RGB) value for each pixel. In the present invention, the frame buffer contains distance and brightness values associated with each pixel. Brightness values are representative of reflectivity from the target object, rather than the color of the object. For example, even a black object target surface may have a high degree of reflectivity when viewed at certain angle. If such a camera were combined with an ordinary luminosity-based camera, both distance and RGB values can be processed, according to the methodology of the present invention.

Figure 8:
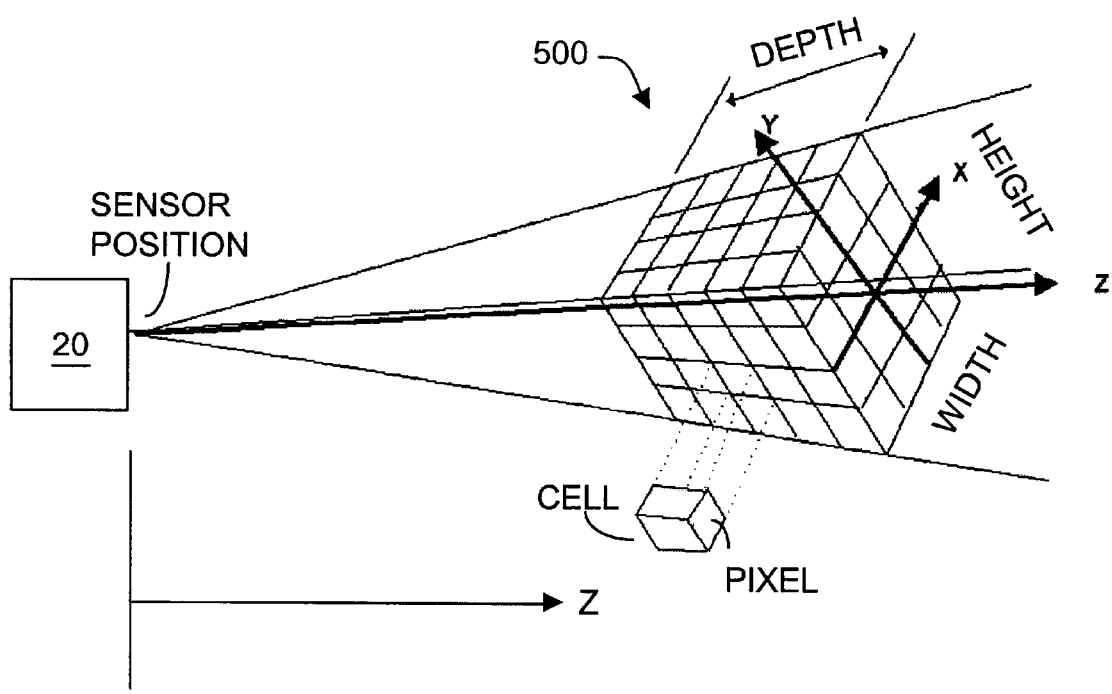
FIG. 8 depicts a three-dimensional sensing grid, according to the present invention.

As used herein, a three-dimensional grid is defined in the viewing field of the camera or other device acquiring reflected energy. As shown in FIG. 8, grid 500 may be defined as starting at a certain distance Z from the front of the camera, e.g., camera 20 in FIGS. 1A or 1B by way of example. The distance may vary depending upon specific applications and optical properties of the camera, but a distance Z in a range of about 1 m to about 3 m is typical for consumer-grade applications, including home use systems. For virtual input devices such as a keyboard, a mouse, a stylus, a typical depth of field is about 10 cm to about 30 cm. As shown in FIG. 8, the grid is definable as having depth, width and height properties. These property dimensions can very depending on the application, electronics and optical configuration of the camera.

Figure 9:
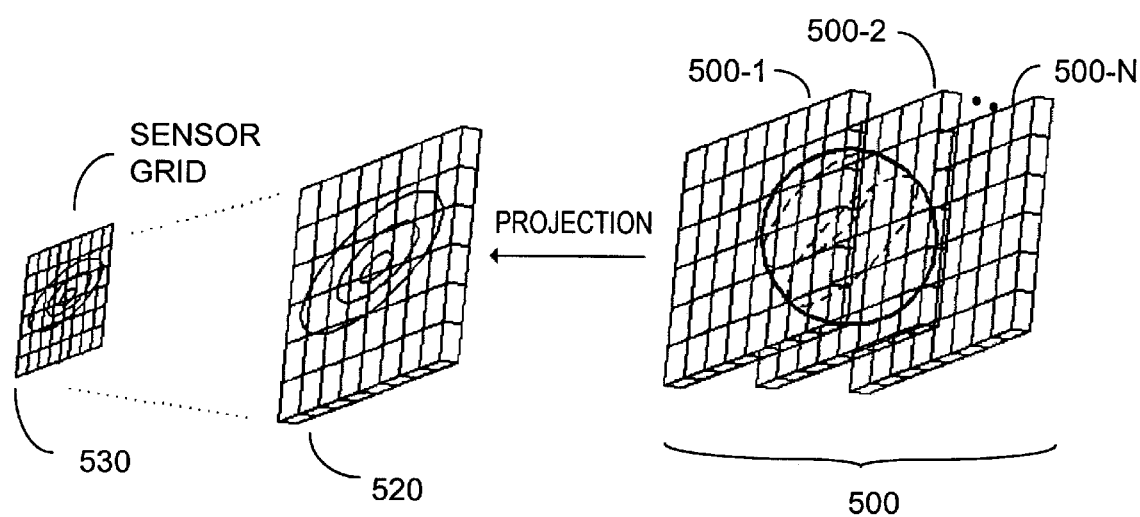
FIG. 9 depicts decomposition of a sensing grid, and projection plane mapping, according to the present invention.

The axis of the three-dimensional camera, shown as camera 20, passes through the center of grid 500. Grid 500 may be defined as a series of parallel planes 510-1, 510-2, 510-3, etc. as shown in FIG. 9. These parallel planes are orthogonal to the camera axis, which is shown in FIG. 8 as the Z-axis. But as described later herein, in reality, such planes are actually surfaces of ellipsoids that have a pair of focal points (light source 220, and sensor 240) within camera 20. Fortunately, error associated with approximating ellipsoid shells as planar surfaces is relatively small, and is adequately handled using error correction software according to the present invention. In FIG. 9, the depth of each plane 500-N is the resolution in the Z direction. For instance, if the Z-resolution is 1 cm, then the depth of each plane is 1 cm, and distances as close as 1 cm apart can be distinguished by camera 20.

Resolution in the X-axis and Y-axis directions will define the number of cells in each plane 500-N. When an object (perhaps target 30 in FIG. 1A) falls within (or is placed within) the three-dimensional viewing grid of camera 20, the target surface facing the camera will intersect with the planes of the grid. The projection of these intersections on a two-dimensional plane defines the contour lines of the object. All the points on a contour line are points within the same distance (approximated by the Z-resolution and geometric distortion) from the camera. In a typical arrangement, the projection plane is mapped to an array of sensor elements (pixels) in the camera organized in a rectangle. See for example FIG. 5 and FIGS. 7A–7O.

As shown in FIG. 3, when three-dimensional camera 20 points at a target object 50 within the camera viewing grid, the object surface that is facing light source 220 may reflect at least a fraction of the emitted energy, which reflected energy is captured by sensor array 230. Each pixel 240 within array 230 records a value in response to detected reflected energy, which value is a measure of the distance between the pixel element and the target surface reflecting the energy. As described earlier herein, a sensor based upon time of flight will record the time an emitted energy pulse travels from the pulse source, and is detected upon being reflected from the target surface. The distance, or Z-value, is proportional to time of flight divided by the speed of light. As described later herein, the luminosity of the target surface may also be used as an aid in accurately measuring distances.

In many situations it is necessary to determine distance to a moving target. Capturing Z-values of moving objects requires repeating distance measurements, perhaps at a repetition rate of thirty times per second, to generate a sequence of Z-value frames for the moving object. The data acquired for each frame (e.g., thirty frames/second in this example) is processed, and the system with which the distance measurement is used will be given a matrix of Z-values. Each Z-value will be a distance value in appropriate units, e.g., cm, or will be a null or an infinite value, signifying no valid distance measurement.

It is a function of the present invention to improve the measurement accuracy of such data acquisition in three-dimensional distance ranging systems. Collectively, software and techniques according to the present invention include over-sampling, the use of various averaging techniques including moving averages, averaging over pixels, intra-frame averaging, using brightness values to reduce error, placing a calibration target having at least one region of known reflectivity within the field of view of interest, correcting for geometric error including elliptical error. Advantageously, the present invention also permits encoding Z distance values in RGB Applicants' over-sampling method for improving measurement accuracy in three-dimensional systems including system 10 as shown in FIG. 1 will now be described.

Referring to FIG. 3, resolution of depth or distance measurement could be improved by increasing the repetition rate of the emitter energy pulses from emitter 220. The repetition rate could be increased substantially higher than a nominal frame rate (30 frames/second) and averages of detected reflected energy could be used to form intermediate samples to produce a frame. Applicants have found this method to effectively reduce error margin associated with distance measurement, because each emitted energy pulse (typically a laser pulse) results in an independent measurement of the distance to the target surface, within an error margin. Therefore, in a first aspect of the present invention, multiple measurements are made, including measurements at higher than nominal frame rate, and averages of multiple measurements are made, to substantially reduce error in enhance distance measurement accuracy. In general, error margin for an average of N independent measurements reduces error proportionally to $\sqrt{N}$, the square root of N.

This averaging method is also effective for moving objects, providing the distance the object moves between two frames falls within the measurement accuracy of the system, e.g., system 10 or other three-dimensional imaging system. For instance, the head of a person walking towards an observer moves with a rate of about 0.4 mm per frame, but Z-measurement error margin may be as high as 10 mm to perhaps 100 mm, especially if emitter 220 is an inexpensive device that does not output substantial energy for a given level of system power. But according to the present invention the error can be reduced to about 1 mm to about 10 mm by over-sampling at the rate of 100 samples/frame, e.g., reduction is proportional to $\sqrt{N}$ or $\sqrt{100}$, or ten-fold in this example.

Figure 10:
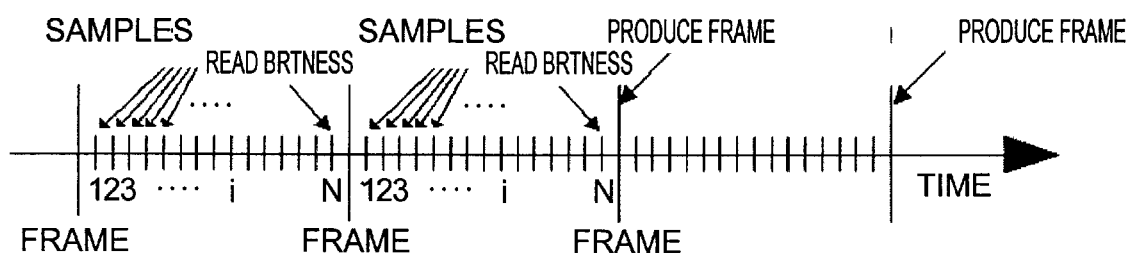
FIG. 10 is a timing diagram depicting over-sampling, according to the present invention.

Thus, referring to FIG. 3, software associated with 280 and/or 285 upon execution by CPU 260 will cause emitter 220 to output energy pulses at a higher repetition rate, and will cause averages from the return data to be made and used, to reduce Z-measurement error margin. FIG. 10 is a timing diagram depicting a preferred implementation of over-sampling, according to the present invention. In constructing a frame, energy source 220 will emit pulses at a relatively high repetition rate, perhaps 100 times/frame, depending upon the hardware configuration of the system, and the requirements of the application at hand. The acquired samples may be averaged in hardware or in software. Hardware-implemented averaging may be done at each pixel 240 by accumulating time of the flight delays for that pixel. Such accumulation may be done within that pixel's associated circuitry, e.g., 250 (see FIG. 3, FIG. 4). At each frame, the sensor 230 will emit the sum of all samples per pixel. It is then straightforward for software, e.g., 280 and/or 285 to compute an average by dividing the output value sum by the number of samples used to produce each value.

While waiting for the next frame to be captured, software (e.g., 280 and/or 285), again operating under control of CPU 260, will compute a running or current average of the time counters (e.g., 320 in FIG. 4) for each pixel. If desired, the software routine can apply a heuristic and discard samples that do not meet certain threshold values when compared to current average, or to the value of neighboring pixels within pixel sensor array 230.

In the above description, preferred methods of ordinary arithmetic averaging were disclosed. In the following section, applicants' techniques directed to so-called moving averages and running averages will be described. In overview, a method of moving averages is used to bias an average toward more recent data measurements, the a method of running averages is often used to reduce the round-off errors when adding a large number (e.g. a sum) to a smaller value, e.g., a present observation. An additional advantage of running averages is that it can reduce the storage requirements of memory 270 and/or 280 and/or 285 or other memory associated with system 10 (see FIG. 1A). It is also noted that applicants' various averaging techniques may be carried out in software and/or hardware, for example by summing output signals from pixels in capacitors, and then dividing the resultant signal by the number of samples.

A detailed description of applicants' method of moving averages will now be given. Let a parameter defined as $\phi$ be used to bias the averaging by defining the size of the moving average windows. Further, let $C_j(i)$ be the moving average of counter (e.g., counters 320 in FIG. 4) values from samples 1 to i for pixel j. Then:

$$C_j(i) = \phi C_j(i-1) + (1-\phi)c_j(i) \text{ where } 0 < N < 1.$$

As parameter $\phi$ approaches zero, the size of the moving average windows narrows, and the average will be more influenced by the most recently captured or acquired samples. As $\phi$ approaches unity, the windows is effectively wider and the average will be influenced by earlier captured measurements. For fast moving target objects, a value of $\phi$ closer to zero is appropriate, whereas for stationary target objects, a value of $\phi$ approaching one is more appropriate. If desired, software 280 and/or 285 can cause this method to average across frames.

In another aspect, the present invention conserves memory by using a method of running averages, which can conserve the number of bits per pixel needed to hold the sum of the samples. In general, if the range of a value captured at each sample is $(0, 2^m - 1)$, m bits will be required to store a value, and storing the sum of $2^n$ samples will require m+n bits of storage per pixel. For instance if the range of each measurement is between 0 to 255 ($2^8 - 1$), 8-bits (1 byte) of storage will be required per pixel. If the sampling rate is 100 times per frame, an additional 7 bits per pixel would be required, or in round numbers, two-byes of memory per pixel. For a large array of pixels, the additional bits can require a substantial memory size, which disadvantageously would add to system cost and increase power consumption.

The present invention alleviates the need for extra bits by applying a method of running averages. According to applicants' method of running averages, at each sample the running average of the measurement is maintained, up to that point in time. Since the value of intermediate running averages will not exceed the range of the measurement, it is only required to store m bits to store the desired final average.

Let $c_j(i)$ be the sampled value of pixel j at sample i, and let $C_j(i)$ be the running average of the measurement from samples 1 to i for pixel j. It follows that:

$$iC_j(i) = (i-1)C_j(i-1) + c_j(i)$$

or $$C_j(i) = (i-1)C_j(i-1)/i + c_j(i)/i$$

For the above example, the computation shown will require a single 16-bit register to evaluate the term $(i=1)C_j(i-1)$, but the result can be stored back in an 8-bit (one-byte) register per pixel. Understandably this can advantageously decrease the storage size requirements and power consumption requirements for on-chip memory, including RAM 270 in FIG. 3, or equivalent memory.

Another aspect of the present invention reduces errors by averaging over pixels. More specifically, the value of adjacent pixels in the sensor array is used to adjust distance measurement at each pixel. This method can be especially effective for targets having smooth surfaces, and can also be used to eliminate noisy pixels whose distance value outputs are simply not consistent with the surface properties of the object target. It is noted that information in neighboring pixels can be used for two different purposes: to smooth-out measurement at the pixel level, and for deriving sub-pixel information.

Another aspect of the present invention provides intra-frame averaging by which measurements are averaged across frames to further improve measurement accuracy. The moving averages parameter φ can be adjusted to vary the weight of recent frames in the past or in future, in calculation of Z-values in the current frame. (Intra-frame averaging tends to lose usefulness as the target object moves.) After each frame is created, two approaches are available to start the next frame. One can reset system buffers and start anew from clear buffers, or one can set the last buffer as the initial state for the next frame. The amount of memory for capture and frame buffer can vary as a function of sensor grid size.

In addition to the various approaches to reduce error described above, the present invention provides further techniques to reduce Z-measurement error. One such technique uses brightness values to reduce error. As noted, systems such as system can provide both distance and brightness values per each pixel in the sensor array. The brightness value is a cumulative value that reaches its maximum value at the last capture, at time N, before a frame is formed. Software 280 and/or 285 can read the brightness value for each pixel, in sequence, just after time N, e.g., after the last capture. The brightness values can be used to determine if a distance measurement should be kept or discarded. In general, higher brightness values give rise to more accurate distance measurement.

Figure 11A:
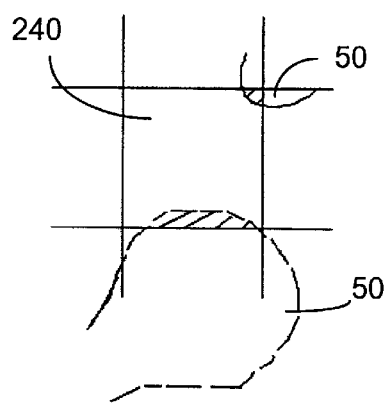
FIGS. 11A–11C depict relatively low pixel brightness, average pixel brightness, and high pixel brightness, according to the present invention.
Figure 11B:
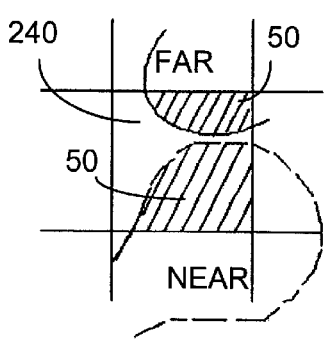
Figure 11C:
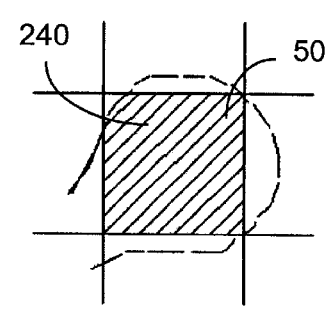

Brightness value depends on factors including surface reflectivity of the target object within imaging view, distance between the camera and the target object, the fraction of the cell that is covered by the target object, and so forth. FIGS. 11A–11C depict usage of brightness values, according to the present invention. In FIG. 11A, brightness perceived by the recipient pixel 240 is relatively low because the target object 50 barely intersects with the pixel (assuming there is a black surface behind the target object). However in FIG. 11B, an average brightness value is reported by pixel 240 because the pixel is partially covered by either two objects or different portions of a common object, in which the pixel bottom portion of the object is near relative to the pixel top portion. Note that interpreting the data is complicated by the fact that in FIG. 11B, the top object portion may be in a different plane than the bottom object. In FIG. 11C, pixel 240 reports high brightness (again assuming high object reflectivity) because the object covers or fills most of the pixel detection area.

The present invention presents brightness values $b_i$ to software stored in memory 280 and/or 285, in a scale from 0 to $B_{max}$, for every pixel i. If the brightness of a pixel is below a certain threshold, $B_{threshold}$, then the error in distance measurement for the pixel is below an acceptable range. Table 1, below, shows theoretical accuracy of a three-dimensional camera in certain configurations, as a function of the diffused reflectivity of the target object.

TABLE 1

| Reflectivity | $R_A$ | Brightness Measure | Resolution cm | Comment |
| --- | --- | --- | --- | --- |
| 0.1 | | 26 | 6.4 | |
| 0.25 | | 64 | 2.4 | |
| 0.50 | | 128 | 1.2 | Hand |
| 0.75 | | 191 | 0.8 | |
| 1.0 | 0.3 | 255 | 0.6 | White surface |
| Reflective Strips | 400–1500 | | | Reflective tape? |

In Table 1, $R_A$ is coefficient of retroreflection, and is measured according to test protocols for retroreflective intensity test procedures promulgated by ASTM E809 and E810 ($R_A$) or EIE 54:1982(R'). According to Table 2, $B_{threshold}$ is set to approximately 60, due to a knee in a graph plot of values.

Note that a system-recognizable reflectivity-calibrated sub-target can be placed within the field of view to assist in the above determinations. In FIG. 1B, for example, the user wears at least one ring 520 that presents at least one region of known pre-calibrated reflectivity for use by system 10. In FIG. 2A at least one sub-target 520 is located on a substrate, in this instance sub-target 520 present three separate regions of differing but pre-calibrated reflectivity. In embodiments of system 10 in which a user "types" on a table top, a piece of cardboard could be provided containing a pattern of differing regions of known reflectivity. The use of such sub-targets, including sub-targets within a predictably known range of Z-distance can assist the present invention in the accuracy refining methods described herein.

Several approaches are available for using a distance calculation when the brightness of a pixel is less than an acceptable threshold. In one aspect, the present invention implements a voting procedure based on the brightness values of adjacent cells. For example, let $B_{threshold1}$ and $B_{threshold2}$ ($B_{threshold1}<B_{threshold2}$) define a range of low brightness values, and let $b_i$ be the measured brightness value of pixel i. For all pixels i, $b_i$ is modified according to the following relationships, which are preferably software implemented:

$b_i$=if $b_i<B_{threshold1}$ then 0

$b_i$=if $B_{threshold1}<b_i<B_{threshold2}$ then $B_{marginal}$ otherwise $B_{acceptable}$ where $B_{marginal}$ and $B_{acceptable}$ are two non-zero values (e.g., 1 and 2) used to encode the weight of marginal and acceptable brightness values. In a revised brightness buffer, preferably part of RAM 270, pixel brightness is either in acceptable range, marginal or it is zero. Let $c_i$ be a time delay counter (e.g., counter 320) value of pixel i.

Finally, for all pixels i, a new $c_i$ is calculated in a fresh buffer, as follows, to obtain a usable value for calculating Zs:

new $c_i$=if $b_i$=0 then 0
new $c_i$=if $b_i=B_{acceptable}$ then $c_i$
new $c_i$=if $b_i=B_{marginal}$ then
{
  Let m=number of pixel i's neighbors;
  Let S=[bag of all pixel i's neighbors with $b_{acceptable}$ brightness]
  Let k=the number of elements in S;
  If (k>M) then
  {
    Let v=average of $c_j$ values for all pixels j in S.

Figure 12:
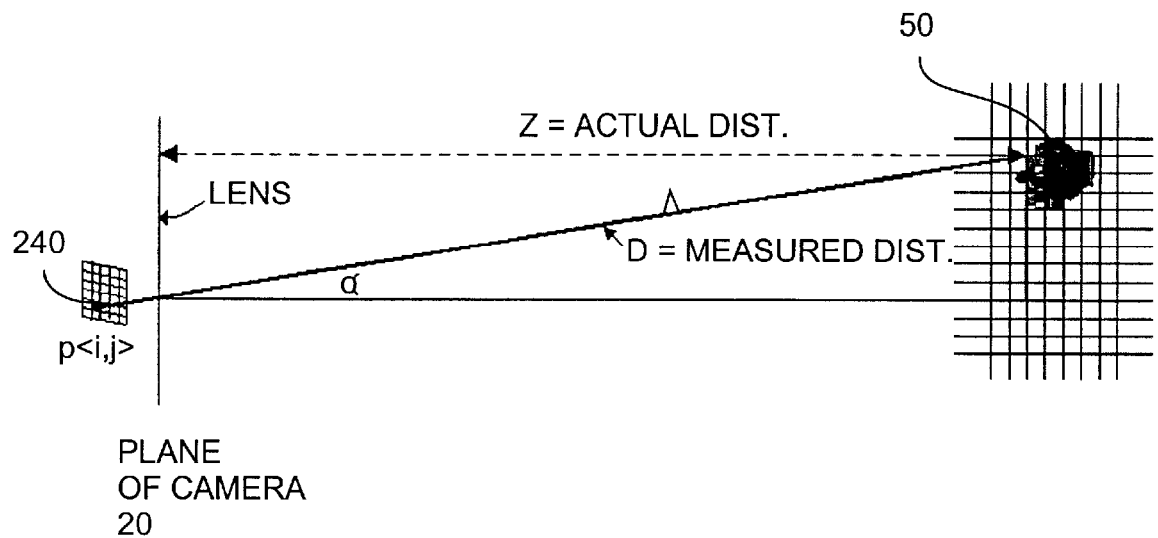
FIG. 12 depicts relationship between camera plane, Z distance and D distance, according to the present invention.
Figure 13:
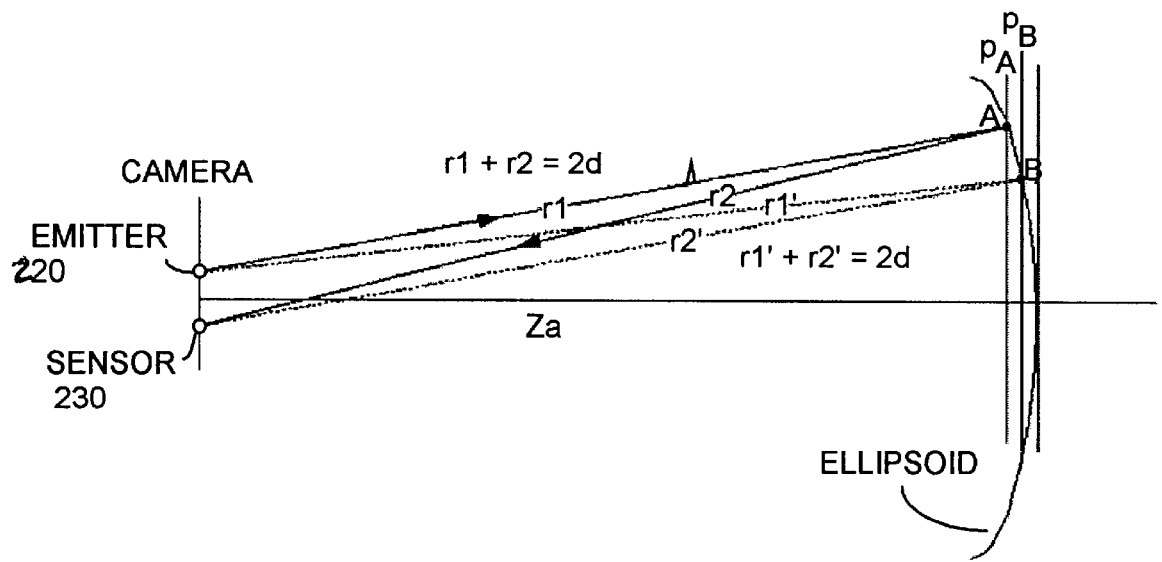
FIG. 13 depicts elliptical error correction, according to the present invention.

```
    Return v;
}
Else
    Return 0;
}
```

Where 0<M<m is a configurable constant that determines the number of pixel i's neighbors with $b_{acceptable}$ brightness required to estimate distance value for pixel i Another aspect of the present invention is directed to correcting for geometric errors in three-dimensional systems such as system 10, which errors are demonstrated in FIG. 12 and FIG. 13. A range finding system such as system 10 determines the radial distance to a target object from the system. But a geometric correction must be implemented to accurately map distance from the plane of the observer camera 20 to the planar distance of the target object 50. In applications such as system 10 (see FIG. 1A) the distance separating energy transmitter 220 and detector 230 is perhaps 1.2 cm to 2.5 cm, a distance that is not negligible relative to the typical range of Z-distances to be measured, perhaps 20 cm to 30 cm. Further, within the range of Z-distances, target objects encompassing a relatively wide angle are to be measured. Thus, to increase measurement accuracy, the present invention provides a method of computing necessary correction for different pixels in the sensor array of pixels. The preferred method will now be described.

As shown in FIG. 12, the distance reported by system 10 (and other such systems) is a radial distance D between the object target and a pixel p(<i,j>). But the actual, planar, distance Z for the same pixel can differ from measured distance D, and in general a geometric transformation must be applied. In the preferred implementation, this transformation is carried out by software stored in memory 280 and/or 285, preferably under execution by CPU 260.

Referring to FIG. 13, in general, energy emitter 220 and sensor 230 will define two anchor points or foci of an ellipse. When distance values are mapped to planes in a three-dimensional grid, two points with the same distance value may in fact map to different planes on the three-dimensional grid. Note in FIG. 13 that camera 20 views the scene at the right of the image and reports the same distance readings for scene point A and scene point B. But point A will map to plane $p_A$ at a distance $Z_A$ from camera 20, and point B will map to plane $p_B$ at a distance $Z_B$ from camera 20.

Figure 14:
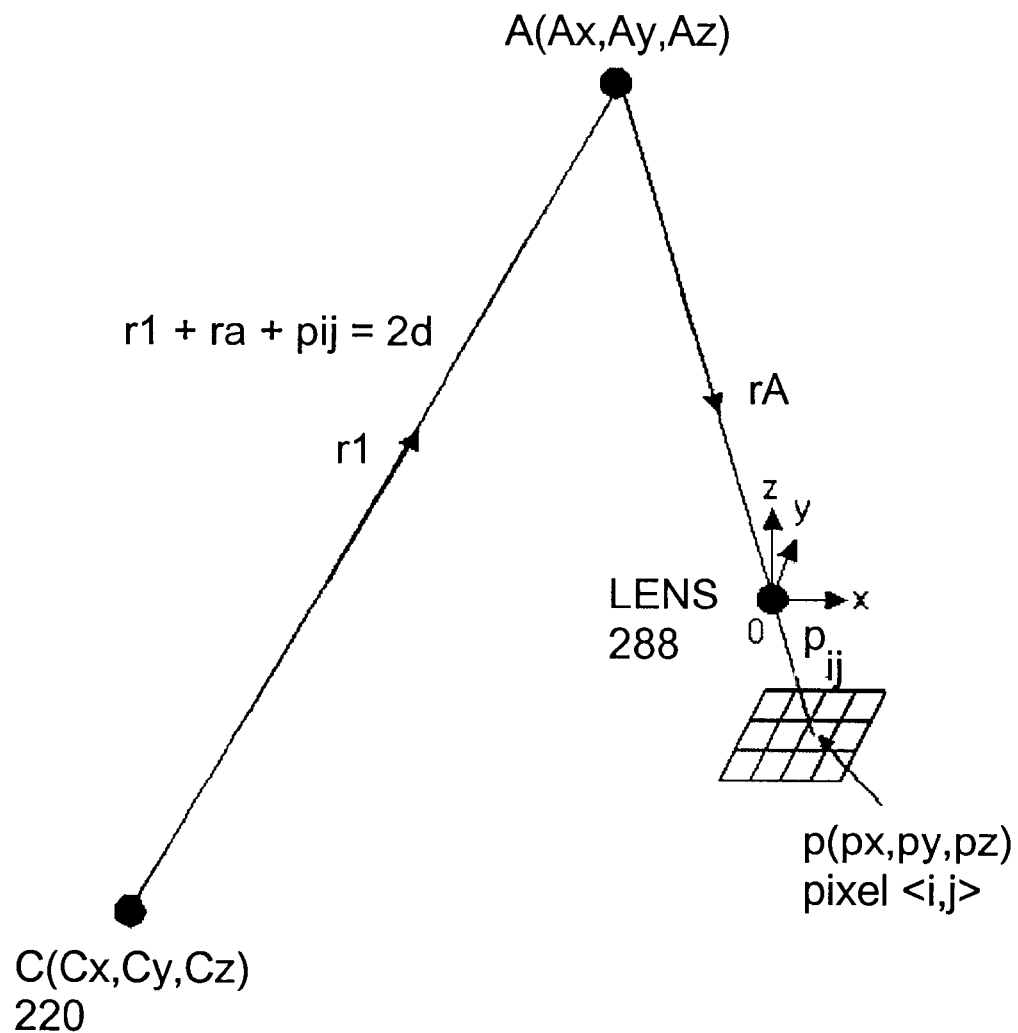
FIG. 14 depicts the relationship between the laser source, an exemplary pixel sensor, and a point in a three-dimensional plot, according to the present invention.

Turning now to FIG. 14, the relationship between energy source 220 (point C), a single pixel sensor p (<i,j>), and a target object point A in a three-dimensional plot is shown. In FIG. 14, lens 288 is used as the coordinate origin point. Assume that the image of point A is mapped at p, (pixel <i,j>). Let $r_1$ be the distance from source 220, point C, to point A, let $r_A$ be the distance from point A to the origin 0, let $p_{ij}$ be the distance from pixel p to the origin, and let 2d be the total distance of light travel from source 220 to point A and reflected back to pixel p. Assume that what is wanted is a calculation of coordinate ($A_x$, $A_y$, $A_z$) for point A, given the light travel distance 2d. If the coordinate of point A can be sufficiently accurately calculated, the elliptical error associated with two points having the same light travel distances can be corrected.

Assume that the spherical coordinate of pixel p is ($p_{ij}$, $-a_{ij}$, $-b_{ij}$), where $p_{ij}$ is the radius (distance) between the origin and the pixel p, $-a_{ij}$ is the angle from the x-axis to the projection of the vector op (where op is the vector from the origin to pixel p) onto the xy-plane, and $-\beta_{ij}$ is the angle from the z-axis to vector op. (Therefore, in Cartesian coordinate system, the coordinate of pixel p is ($p_x$, $p_y$, $p_z$)=($p_{ij}$ cos($-a_{ij}$)sin($-b_{ij}$), $p_{ij}$ sin($-a_{ij}$)sin($-b_{ij}$), $p_{ij}$ cos($-b_{ij}$)).) Since the relation between lens (the origin) and pixel p is fixed, angles $a_{ij}$, and $b_{ij}$ and distance $p_{ij}$ can be determined, based on the actual geometrical configuration of the sensor. Therefore, for each pixel <i,j>, angles $a_{ij}$ and $b_{ij}$ and distance $p_{ij}$ are known.

Since point A is mapped at pixel p, point A should lie on the line that passes through the origin and pixel p. Further, the direction of vector oA (the vector from the origin to point A) is in the opposite direction of vector op. Therefore, in a spherical coordinate system, point A can be represented as ($r_A$, $a_{ij}$, $b_{ij}$). Therefore, the following relationships are true:

$$A_x = r_A \cos(a_{ij})\sin(b_{ij}),$$

$$A_y = r_A \sin(a_{ij})\sin(b_{ij}),$$

and $$A_z = r_A \cos(\beta_{ij}) \quad (1)$$

Calculating the coordinate of point A using the above formula requires first calculating $r_A$. But since $r_1+r_A+p_{ij}=2d$, $r_1=2d-r_A-p_{ij}$, the following is true:

$$(2d-r_A-p_{ij})^2 = r_1^2 = (C_x-A_x)^2+(C_y-A_y)^2+(C_z-A_z)^2 = (C_x r_A \cos(a_{ij})\sin(b_{ij}))^2+(C_y-r_A \sin(a_{ij})\sin(b_{ij}))^2+(C_z-$$

The above equation may be simplified and solved for $r_A$, which yields:

$$r_A = ((2d-p_{ij})^2 - k_{ij})/(4d-h_{ij}) \quad (2)$$

where $$k_{ij} = C_x^2 + C_y^2 + C_z^2,$$

and $$h_{ij} = 2(p_{ij} + C_x \cos(a_{ij})\sin(b_{ij}) + C_y \sin(a_{ij})\sin(b_{ij}) + C_z \cos(b_{ij})) \quad (3)$$

Since $C_x$, $C_y$, $C_z$, $p_{ij}$, $a_{ij}$, and $b_{ij}$ are known, $k_{ij}$ and $h_{ij}$ can be calculated for each pixel <i,j>. More preferably, tables of $k_{ij}$, and $h_{ij}$, are constructed and stored, e.g., in memory 280 and/or 285 for all pixels for look-up purposes, to made calculations speedier. Once the light travel distance 2d values are known from the sensor-collected data, $r_A$ can be calculated, and using the calculated value of $r_A$, the coordinate ($A_x$, $A_y$, $A_z$) of point A is readily calculated.

To recapitulate, one aspect of the present invention provides the following procedure steps for elliptical error correction:

(1) Based upon actual geometrical sensor array configuration, define the spherical coordinate of each pixel in the sensor array, and construct a look-up table holding spherical coordinates for each sensor pixel;

(2) Measure and define the coordinate of the laser or other energy source;

(3) For each pixel <i,j>, calculate constants $k_{ij}$ and $h_{ij}$ using formula (3), and build look-up tables containing $k_{ij}$ and $h_{ij}$;

(4) From the detected image, locate pixels <i,j> that detect objects, i.e. pixels that receive reflected energy from a target object;

(5) For each pixel <i,j> obtained from step (4), calculate $r_A$ using formula (2) and using $k_{ij}$, and $h_{ij}$ from look-up tables constructed at step (3), and calculate distance data 2d at pixel <i,j>;

(6) Apply formula (1) to calculate actual coordinate of the object detected at pixel <i,j>.

Note that formula (1) can be rewritten as follows:

$$A_x = r_A t_{ij}^x,$$

$$A_y = r_A t_{ij}^y,$$

and $$A_z = r_A t_{ij}^z,$$

where $t_{ij}^x = \cos(a_{ij})\sin(b_{ij})$, $t_{ij}^y = \sin(a_{ij})\sin(b_{ij})$, and $t_{ij}^z = \cos(b_{ij})$. Constants $t_{ij}^x$, $t_{ij}^y$, and $t_{ij}^z$ can be calculated in advance and stored in look-up tables, preferably stored in memory, e.g., 280, 285 on IC 210.

Note also that since all pixels are relatively close to each other, the difference between relevant $p_{ij}$'s is rather small, and that these $p_{ij}$'s may be approximated by a fixed value, say p. So doing can advantageously reduce the overall memory requirements otherwise associated with storing all $p_{ij}$ values.

In one aspect, the present invention recognizes a special case in which elliptical correction reduces to spherical correction. When typically laser source 220 is close to the receiving lens 288 (see FIG. 3), the ellipsoid shown in FIG. 13 becomes a sphere. Further, coordinate $(C_x, C_y, C_z)$ of the laser source (point C in FIG. 14) can be approximated by the origin (0,0,0). It follows from formula (3) that $k_{ij}=0$ and $h_{ij}=2p_{ij}$, and from formula (2) that $r_A = d - 0.5p_{ij}$. In this case, calculating coordinate $(A_x, A_y, A_z)$ of point A is then simplified into the following equations:

$$A_x = (d - 0.5p_{ij})t_{ij}^x,$$

$$A_y = (d - 0.5p_{ij})t_{ij}^y,$$

and $$A_z = (d - 0.5p_{ij})t_{ij}^z, \quad (4)$$

where $t_{ij}^x = \cos(a_{ij})\sin(b_{ij})$, $t_{ij}^y = \sin(a_{ij})\sin(b_{ij})$, and $t_{ij}^z = \cos(b_{ij})$.

Another aspect of the present invention is directed to using intra-pixel interpolation to enhance resolution in the X-Y axes. One method of intra-pixel interpolation is termed bilinear (also called twisted-plane, area-weighting, or four-point). The bilinear method is used in still or video images, as described by Margaret M. Fleck. But in the present invention, this method is applied to obtain higher X-Y resolution and corresponding Z values. Let digitized Z values at i,j be Z(i,j) and assume what is desired is distances to a continuous image d(x,y). The x-y plane will define a denser grid than i,j. But assume that distance value at location (i+p,j+q)is required, where i and j are integers, p and q are in [0, 1.0). One can approximate d(i+p,j+q) using the values at the four nearest integer locations according to the following formula:

$$d(x,y) = (\text{approx})(1-p)(1-q)Z(i,j) + p(1-q)Z(i+1,j) + q(1-p)Z(i,j+1) + pq\,Z(i+1,j+1)$$

Assume that x-y measurements are made at 100×100 resolution, but what is desired is distance measurements with 400×400 resolution. In the above equations, parameters p and q take the values 0.25, 0.50 and 0.75. Since this equation is based upon a linear approximation, applying the equations tends to flatten peaks and smooth signals. Notice that such distortion of image values cannot be acceptable in some applications, especially if the mathematical operation is repeated several times.

Fitting a second-order surface to the data at integer locations gives better performance on peaks, troughs, and similar features, see Bracewell, Ronald N. (1995) *Two-Dimensional Imaging*, Prentice-Hall, Englewood Cliffs N.J. (ISBN: 0-13- Bracewell 062621-X). Bracewell at page 249 gives a second-order formula for interpolating values from six nearby points, which formula is relatively simple and thus fast, yet may be significantly more accurate than traditional bilinear interpolation.

Again, suppose that the distance value at location (i+p, j+q) is needed. The present invention first determines which of the four nearest integer locations is closest; assume the nearest integer is (i,j). In this case, the interpolated value is:

$$d(x,y) = (\text{approx})0.5q(q-1)$$

$$Z(i,j-1) + 0.5p(p-1)Z$$

$$(i-1,j) + (1 + pq - p^2 -$$

$$q^2)Z(i,j) +$$

$$0.5p(p - 2q + 1)Z$$

$$(i+1,j) + 0.5q(q - 2p + 1)$$

$$Z(i,j+1) + pq\,Z(i+1,j+1)$$

Yet another aspect of the present invention is directed to brightness-based resolution improvement for a system such as system 10 that can provide both distance and brightness measurements. Once an object's distance has been accurately determined, its reflectance may be calculated from the brightness measurement. This reflectance measurement can then be used to more accurately determine its distance the next time the object is observed. If an object's reflectance is known, its new distance can be determined accurately from its brightness at the new distance. Such brightness based distance estimate can be then used to correct and improve the sensors; direct distance measurement for new location of the object. This method is especially useful where the object may be observed in its new position for a short period of time, thus increasing uncertainty of the distance measurement at the new location. This method requires the presence of a particular object that can be recognized such that its reflectance, calculated from a previous observation, may be used. For each observation of the object, the sensor distance measurement and brightness values may be combined to produce a more accurate estimate for present distance and for object reflectance.

The relationship between target object brightness and distance may be expressed as:

$$b = K/d^q$$

where b is brightness, d is distance from energy source to target object, and K is a measure of reflectivity of the target source for emissions from the energy source. The value of K may be experimentally calculated by placing the object target at a known distance from the system providing the energy source. The exponent q is 2 if the emission is a point source, and is less than 2 if the emission source is diffused. For the case q=2, distance can be calculated by:

d=√(K/b), e.g., d is proportional to the square root of (K/b).

Another aspect of the present invention uses inter-pixel brightness interpolation to increase resolution in the X-Y axes. When the target object in the viewing scene is in motion, changes in the brightness of a pixel can be used to achieve sub-pixel resolution. This technique permits achieving higher resolution in the X and Y directions than is possible from a lower number of sensor pixels. For instance, if five levels of brightness can ordinarily be distinguished for each sensor pixel, when the present method is used, effective resolution is enhanced to 5X by 5Y where X×Y is the number of sensor pixels in the X and Y direction.

Figure 15:
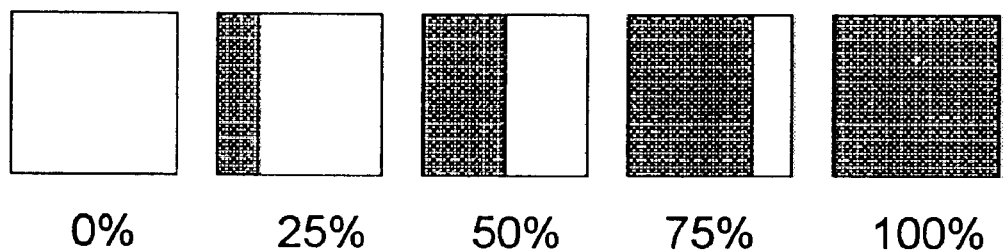
FIG. 15 depicts changing brightness of a pixel in different orientations, according to the present invention.
Figure 15:
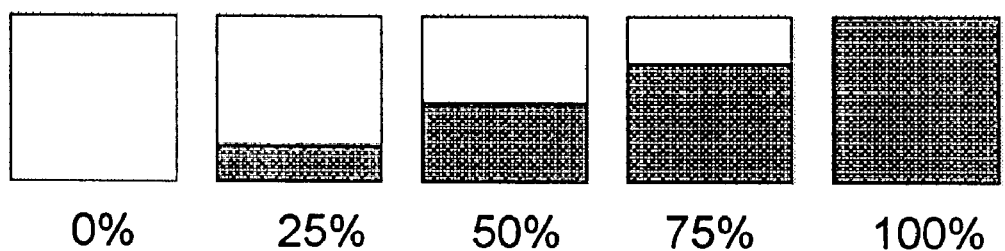
Figure 15:
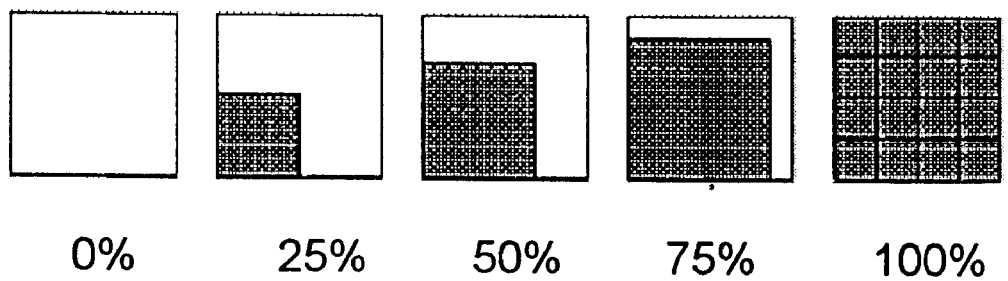

As noted above, just before a frame is generated, the sensor, e.g., data acquisition system such as system 10, can read and store brightness values of each pixel in a buffer. For a moving target object, movement in one of eight general directions (e.g., left, right, top, bottom, upper left, upper right, bottom left, bottom right) from the current pixel can cause changes in the brightness of a pixel. FIG. 15 depicts an object gradually filling a pixel from left to right, from bottom to top and from bottom left to upper right. The value below each pixel is the intensity of the brightness as percent of full brightness. In the top row of FIG. 15, there is depicted the case of increasing pixel brightness in the vertical direction. In the center row, there is an increasing pixel brightness in the horizontal direction, and in the bottom row of FIG. 15 there is an increase in pixel brightness in a north-west direction. It is assumed in FIG. 15 that the maximum brightness value of the pixel is determined by other factors and is relatively fixed value.

Figure 16:
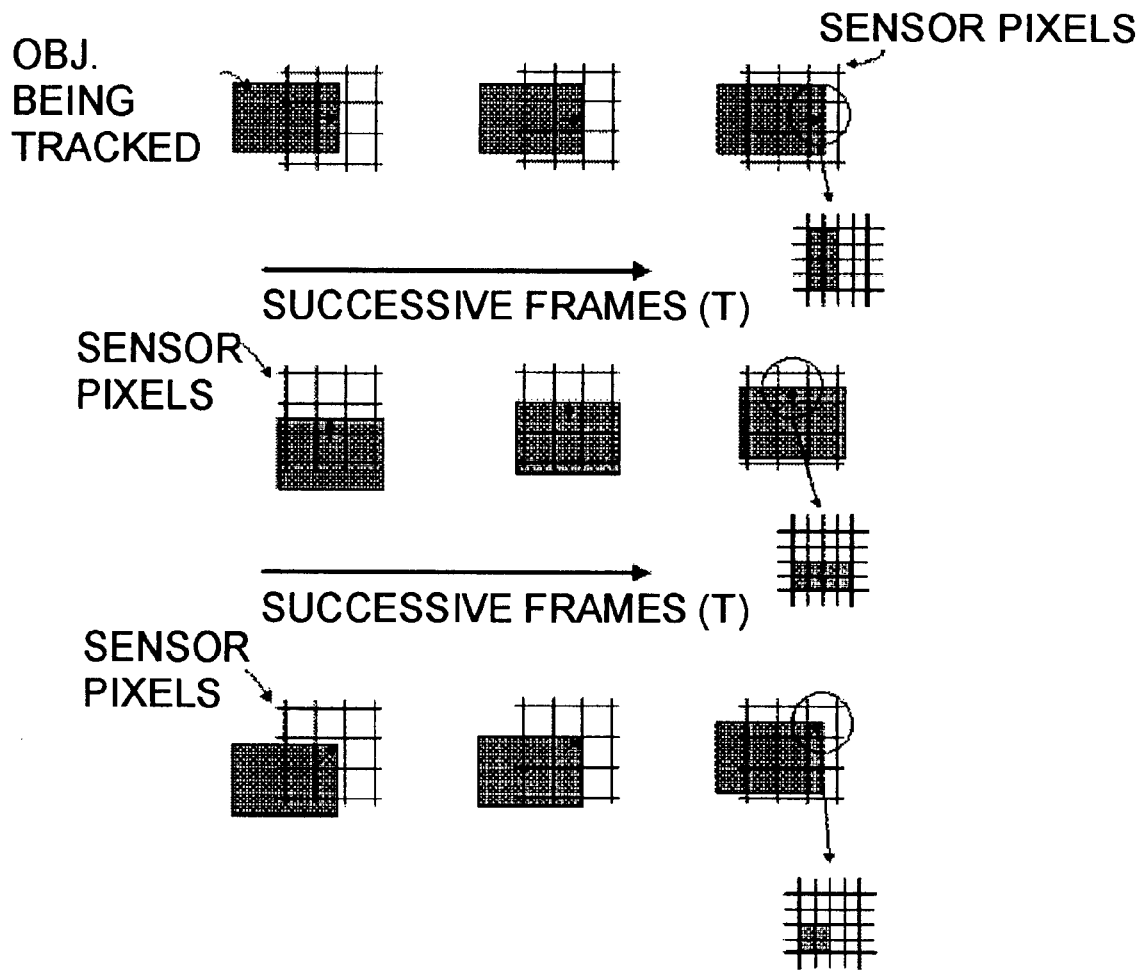
FIG. 16 depicts mapping of sensor pixel brightness values to sub-pixels in a higher resolution matrix, according to the present invention.

Assume it is desired to determine direction of a moving target object from changes in the brightness of the sensor array pixels. For example, if the direction of motion can be determined, it is possible moving, it is possible to light-up the sub-pixel in a higher resolution plane, as shown in FIG. 16. (As used herein, "light-up" refers to setting any application specific property that can be assigned to a pixel of interest, for example, assigning a Z-measurement to a sub-pixel.)

A consideration solely of changes in brightness of a single pixel will not yield object direction information, as above described. One aspect of the present invention uses inter-frame brightness information to determine object movement direction. In FIG. 16, consider the edge of the gray object shown, e.g., the object being tracked. In the top row of FIG. 16, the object is shown moving rightward. This motion direction is determined by noting that in a sequence of frames, the brightness of the pixels to the right of the pixel shown is increasing. Similarly, in the second row of FIG. 16, one observes that the brightness of the pixels above the marked pixel is changing (increasing), and the object is moving upward. The third row in FIG. 16 is more complicated as the object is moving diagonally upward and to the right. This motion direction is deduced by observing the increases in the brightness of the pixels to right, upper right and above the marked pixel.

Once the general direction of a moving target object has been determined, preferably using the above procedure, one can map the brightness value of a sensor pixel (low resolution), as a fraction of full brightness value, to the sub-pixels in the higher resolution matrix, as shown above. For instance, if the viewing object is moving toward upper right corner of the scene, and the brightness value is 25%, according to the present invention, the four sub-pixels in the lower left corner are lit-up, as shown in FIG. 16. Note that the software in a host system, or the embedded memory in the system 10 can be used to maintain the higher resolution pixel plane. This method permits fabricating lower cost three-dimensional image systems by keeping the size of the sensor smaller than the X-Y resolution that is actually reported to the overall system.

Another aspect of the present invention is directed to encoding distance in RGB values. RGB is a method of encoding intensity of Red, Green and Blue colors for each pixel. In a typical encoding of RGB values, each color can range from 0–255 in value. As will now be described, the present invention advantageously can embed Z-distance information for each pixel as part of standard RGB encoding.

The number of bits required for encoding a Z value depends on the resolution of depth and the operating range of system 10. For instance, if the system resolution is 1 cm in a 2 meter operating range, an 8-bit field can encode all valid distance values from 0 cm to 255 cm. An advantage to embedding Z value as part of RGB data is to more fully use existing graphics software (e.g. drivers) to bring new data that the present invention can provide to outside systems and applications. The external system or application will be responsible to restore the original RGB and Z values by performing reverse decoding of data.

In one aspect, the present invention replaces RGB by Z-values. An assumption is that the image does not have or does not require any luminosity information, whereupon the data field that is typically reserved for RGB information can be used to represent Z value for each pixel. The host system or application with which system 10 (or its output data) is used must ensure that the procedures that operate on RGB values are not called for Z values.

Figure 17:
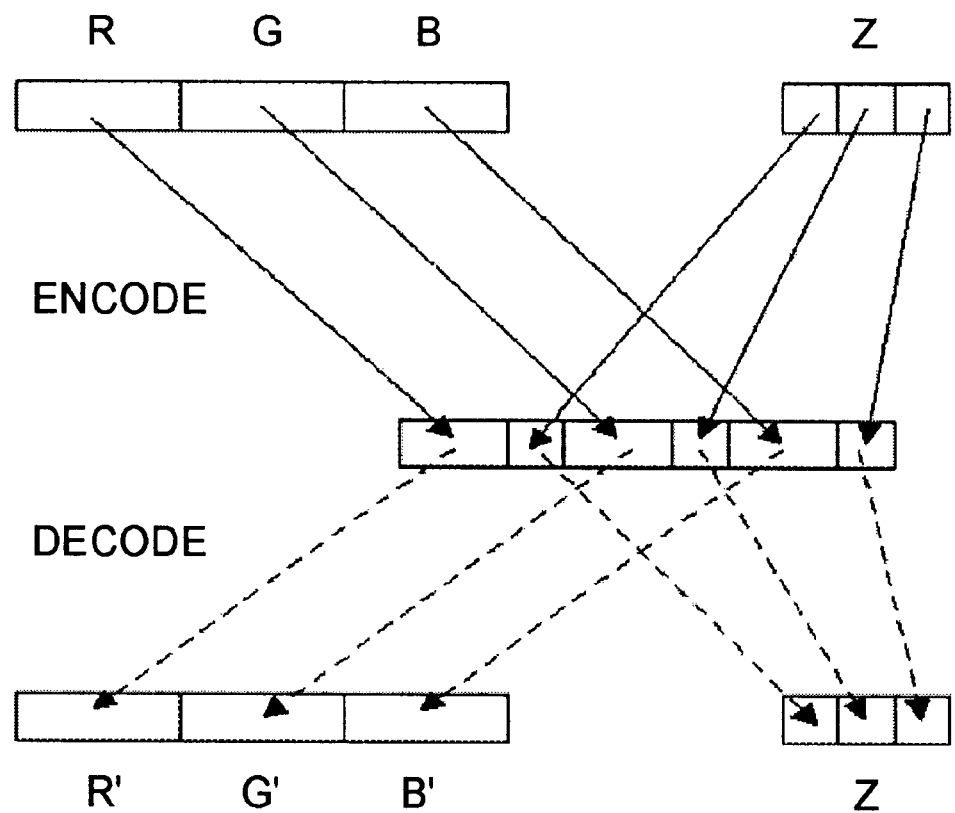
FIG. 17 depicts substitution of RGB values with Z-values, and embedding of Z-values in RGB, according to the present invention.

A simple method of embedding of Z value in RGB assumes that both Z and RGB application must be delivered to the host system or application. According to this aspect of the present invention, lower bits of each color field are used to encode the Z value of the pixel, as shown in FIG. 17. The method shown is indeed simple and permits the use of simple encoding and decoding algorithms. Of course there will be a loss of color information after decoding, and in some applications the resultant image rendering may not appear as intended.

An enhanced method of embedding of Z values in RGB will now be described, a method that assumes both Z and RGB information be delivered to the host system or application. This method requires more processing to maintain original color and Z values, than the simple method described above, but avoids the problem that may arise from loss of color information. This method relies on the fact that human eyes are not sensitive to all color intensities, for example shades of fully saturated yellow or cyan are not typically distinguished.

Traditional analog color television signals do not encode RGB levels directly. NTSC encoding is used in the United States, and involves transforming RGB into YIQ. Y contains the same information as a black-and-white signal, while I and Q carry the color (chroma) information, minus the intensity (luminance) encoded by Y. It is advantageous to convert into the YIQ domain in that so-doing can compress luminance information twice as compactly as compared to using the RGB domain. As a result, unused YIQ segments are available to store distance.

The present invention uses the following procedure to encode Z values as part of the unused or underused part of the YIQ encoding. The preferred method steps, preferably resulting from CPU 260 execution of a software routine stored (or storable) in memory 280, 285, and/or 270, are as follows:

(1) Convert the RGB matrix to YIQ. In this transformation, the RGB value of each pixel will be converted to a YIQ value, which conversion can use existing RGB to YIQ techniques;

(2) Partition the YIQ matrix in terms of three Y, I and Q dimensions (planes). For instance, if the original YIQ matrix uses 24-bit values for each element, logically dissect this matrix into three matrices, each with 8-bit values for each pixel;

(3) Perform (fast) Fourier transformation (FFT) of I and Q dimensions, there being no real necessity to transform the Y dimension;

(4) Allocate segments of I and Q dimensions in the frequency domain for storing the Z values. The segments correspond to the frequencies that, if eliminated from the reverse transformation, will not have any noticeable or adverse effect on the perception of colors by human viewer;

(5) Find all segments that are unused or are below a certain visible threshold. Note that the combined segments must be sufficient large to store Z values for all pixels;

(6) Using an encoding scheme, e.g., Huffman encoding, to encode Z(X,Y) coordinates of each pixel, using these segments. Decide on amplitude of the segments using a just noticiable difference (JND) matrix, calculated for example according to the A. B. Watson model; Note that high frequency segments allocated for Z storage are eliminated by MPEG/JPEG-type compression transformations, or by resealing and cropping type operations. As a result, this approach may be vulnerable to compression and image operations;

(7) Transform I"Q" from frequency domain to time domain, and append Y to create YI"Q" matrix; and (8) Transform from YI"Q"' to R"G"B". The latter matrix will have red-green-blue values for each pixel different from the original RGB matrix, but the difference will not be perceptible to the human eye. The resultant matrix is useable with existing computer algorithms that operate on RGB colors.

(9) To recover Z values, convert R"G"B" back to YI"Q". Set Y aside.

Convert I"Q" to the frequency domain. Extract Z values from the resulting matrix.

Other aspects of the present invention are directed to application-specific methods to improve performance of a system such as system 10. It has been noted that different frame rates may be used advantageously to acquire X, Y and Z axis data. The present invention recognizes that for a fixed number of samples per second, accuracy in Z values and in frame rate may be traded off. For example, there may be 3,000 samples taken by each pixel per second, and the frame rate may be 30 frames/sec., which is to say 100 samples per frame. Using a lower frame rate of say 10 frames/sec would allow more samples to be averaged per frame, thus increasing the accuracy of each frame, again assuming that errors in measurement at each pixel are not correlated.

For certain applications a high frame rate in X and Y is needed, while a high accuracy in Z is needed. The frame rate for Z may differ from that used for X and Y. For example if the regular frame rate is 30 frames/sec then each frame may be used independently for X and Y, and several, e.g., three, frames may be averaged together to produce a single Z value. This would provide a frame rate for Z of 10 frames/ sec. The three consecutive frames will share a same accurate Z value, and the described procedure permits attaining high accuracy Z values, and a high frame rate for X and Y axis data.

Having differing frame rates for X and Y that for Z may pose problems or additional complexity for some applications. To achieve the same noise averaging effects, the Z values for each pixel may be lowpass filtered using a digital filter. The filter bandwidth required for an effective frame rate of about 10 frames/sec is then $[-\pi/3, \pi/3]$. Preferably the lowpass filter is non causal in that distance values in subsequent frames are used to compute lowpassed filtered values of the distance in the current frame. In a virtual input device application such as shown in FIGS. 1A and 1B, this results in a small delay between occurrence of the finger downstroke and when the final keystroke value is provided, e.g., to a host.

Another aspect of the present invention provides object based pixel averaging. According to this technique, several pixels in a scene may correspond to a single object, and averaging the distance for those pixels corresponding to the object will reduce the noise, which has a large random component. For example, in a visual input application such as shown in FIGS. 1A and 1B, if it is determined that a group of n=10 pixels corresponds to a same user's finger, then averaging Z values for each of those pixels can reduce relative noise by $\sqrt{n}$ or by a factor of about three. By way of example, assume for system 10 (as shown in FIG. 1A) that X-Y resolution is about 3 mm×3 mm, in which case about thirty pixels in array 230 will map to a knuckle on a user's finger. According to the present invention, averaging Z readings from thirty pixels will reduce error in Z-value by the square root of 30, or by a factor of about 5.5.

Note that the above-described frame rate reduction techniques may be applied to each pixel before object based pixel averaging. If desired for increased computational efficiency, the frame rate reduction techniques may also be applied to the overall object location after object based pixel averaging.

One aspect of the present invention is directed to physical property based resolution improvement. In this method, XYZ values of pixel representing a same physical object are assumed to adhere to certain physical properties. Unlike single frame considerations, these properties restrict change in location and velocity between frames. For example., if the object is a solid then the velocity vector for each pixel must be an equiprojective field. This implies that the projection of the velocity vector on the axis between two point is the same for both points. Further, since physical objects cannot achieve velocity or rotation instantaneously, the present invention adds appropriate motion restrictions to each pixel or group of pixels to achieve lower noise and enhanced resolution accuracy. For example, in a visual input device application such as shown in FIGS. 1A and 1B, if it is known that a human finger cannot accelerate at more that 10 m/sec$^2$, then a finger assumed at rest in a previous frame has a limited radius of motion permissible to it in the next frame.

The present invention can also recognized a delayed key strike when used with a system such as system 10 shown in FIGS. 1A and 1B. Upon determining which virtual key has been "pressed" on a virtual keyboard, the distance value of a finger about to depress a key may be averaged over several frames during the finger downstroke. So doing permits averaging distance measurement noise over several frames to improve accuracy; since the noise has a substantial random component it tends to average itself out. It can be beneficial to also make use of the frames on the finger upstroke, thus making such additional frames available for averaging, to further reduce noise. Thus, the determination of what key is actually pressed may take place several frames after the actual key press occurred. Note that the time when the virtual key is actually "pressed" determines keystroke order among several fingers that may be about to strike the keyboard. The decision as to what key each of those keystrokes "pressed" can be made later at different times.

Modifications and variations may be made to the disclosed embodiments without departing from the subject and spirit of the invention as defined by the following claims. For example, although many applications of the present invention have been described with a virtual input device system, aspects of the present invention may be used to improve performance other systems acquiring three-dimensional image data in an uncorrelated manner, and other range finding systems unrelated to virtual input device applications. It will also be appreciated that software embodying various or all of the methods and procedures described herein may be promulgated in various forms of computer-readable storage media, for execution with a computer system or computer sub-system that includes at least a processor unit.

What is claimed is:

1. For use with a system that acquires distance and brightness measurements using energy transmitted from an emitter at a first location on a plane, said energy reflecting at least in part from a target object and being detected by independent sensors defining a sensor array on said plane but spaced-apart from said first location, a method of improving actual (x,y,z) measurement by correcting elliptical error of a system including said energy transmitter and sensor array, the method comprising the following steps:

(a) defining a spherical coordinate for said sensors in said sensor array, and constructing a look-up table containing spherical coordinates for each of said sensors, where a spherical coordinate for sensor $P_{ij}$ is given by $(p_{ij},-a_{ij},-b_{ij})$;

(b) defining a spatial coordinate of said emitter from a spherical coordinate system defined in step (a) such that said spatial coordinate of said emitter has a same origin as said spherical coordinate system, where said spatial coordinate of said emitter is $(C_x, C_y, C_z)$ and defining a constant k as square of distance between said emitter and said origin of said spherical coordinate system;

(c) For each sensor $P_{ij}$, constructing a look-up table of a constant $h_{ij}$ where $h_{ij}$ is calculated as follows:

$$h_{ij}=2(p_{ij}+C_x \cos(a_{ij})\sin(b_{ij})+C_y \sin(a_{ij})\sin(b_{ij})+C_z\cos(b_{ij}))$$

where $(p_{ij}, -a_{ij}, -b_{ij})$ is the spherical coordinate of said sensor $P_{ij}$ defined at step (a), and where $(C_x, C_y, C_z)$ is the spatial Cartesian coordinate of said emitter defined at step (b);

(d) identifying sensors $\hat{P}_{ij}$ that actually detect energy reflected from said target object;

(e) using measured rountrip distance $d_{ij}$ from said emitter to sensors $\hat{P}_{ij}$ identified at step (d) to calculate distance $r_{ij}$ from an imaging portion of said target object and said sensor $\hat{P}_{ij}$ according to $r_{ij}=((d_{ij}-p_{ij})^2-k)/(2d_{ij}-h_{ij})$, using values of k determined at step (b), values of $h_{ij}$ determined in step (c), and $\hat{p}_{ij}$ determined in step (a); and (f) calculating actual Cartesian coordinate $(A_x, A_y, A_z)$ of imaging portion of said target objection according to $A_x=r_{ij} \cos(\hat{a}_{ij})\sin(\hat{b}_{ij})$, $A_x=r_{ij} \sin(\hat{a}_{ij})\sin(\hat{b}_{ij})$, and $A_x=r_{ij} \cos(\hat{b}_{ij})$, where $r_{ij}$ is obtained in step (e) and $\hat{a}_{ij}$, $\hat{b}_{ij}$ of sensor $\hat{P}_{ij}$ are obtained in step (a).

2. A computer-readable storage medium whereon is located a computer program that causes a computer sub-system having at least a processor unit to improve actual (x,y,z) measurements by correcting elliptical error in a system that uses energy transmitted from an emitter at a first location on a plane, said energy reflecting at least in part from a target object and being detected by independent sensors defining a sensor array on said plane but spaced-apart from said first location, the computer program upon execution carrying out the following steps:

(a) defining a spherical coordinate for said sensors in said sensor array, and constructing a look-up table containing spherical coordinates for each of said sensors, where a spherical coordinate for sensor $P_{ij}$ is given by $(p_{ij},-a_{ij},-b_{ij})$;

(b) defining a spatial coordinate of said emitter from a spherical coordinate system defined in step (a) such that said spatial coordinate of said emitter has a same origin as said spherical coordinate system, where said spatial coordinate of said emitter is $(C_x, C_y, C_z)$ and defining a constant k as square of distance between said emitter and said origin of said spherical coordinate system;

(c) For each sensor $P_{ij}$, constructing a look-up table of a constant $h_{ij}$ where $h_{ij}$ is calculated as follows:

$$h_{ij}=2(p_{ij}+C_x \cos(a_{ij})\sin(b_{ij})+C_y \sin(a_{ij})\sin(b_{ij})+C_z \cos(b_{ij}))$$

where $(p_{ij}, -a_{ij}, -b_{ij})$ is the spherical coordinate of said sensor $P_{ij}$ defined at step (a), and where $(C_x, C_y, C_z)$ is the spatial Cartesian coordinate of said emitter defined at step (b);

(d) identifying sensors $\hat{P}_{ij}$ that actually detect energy reflected from said target object;

(e) using measured rountrip distance $d_{ij}$ from said emitter to sensors $\hat{P}_{ij}$ identified at step (d) to calculate distance $r_{ij}$ from an imaging portion of said target object and said sensor $\hat{P}_{ij}$ according to $r_{ij}=((d_{ij}-p_{ij})^2-k)/(2d_{ij}-h_{ij})$, using values of k determined at step (b), values of $h_{ij}$ determined in step (c), and $\hat{p}_{ij}$ determined in step (a); and (f) calculating actual Cartesian coordinate $(A_x,A_y,A_z)$ of imaging portion of said target objection according to $A_x=r_{ij} \cos(\hat{a}_{ij})\sin(\hat{b}_{ij})$, $A_x=r_{ij} \sin(\hat{a}_{ij})\sin(\hat{b}_{ij})$, and $A_x=r_{ij} \cos(\hat{b}_{ij})$, where $r_{ij}$ is obtained in step (e) and $\hat{a}_{ij}$, $\hat{b}_{ij}$ of sensor $\hat{P}_{ij}$ are obtained in step (a).

* * * * *